United States Patent
Shiraishi

(10) Patent No.: US 12,541,947 B2
(45) Date of Patent: Feb. 3, 2026

(54) INFORMATION PROCESSING APPARATUS, INFORMATION PROCESSING METHOD, STORAGE MEDIUM

(71) Applicant: NEC Corporation, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

(21) Appl. No.: 18/265,468

(22) PCT Filed: Dec. 16, 2020

(86) PCT No.: PCT/JP2020/046958
§ 371 (c)(1),
(2) Date: Jun. 6, 2023

(87) PCT Pub. No.: WO2022/130534
PCT Pub. Date: Jun. 23, 2022

(65) Prior Publication Data
US 2024/0127581 A1    Apr. 18, 2024

(51) Int. Cl.
*G06K 9/00* (2022.01)
*G06T 7/11* (2017.01)
*G06V 10/764* (2022.01)

(52) U.S. Cl.
CPC .............. *G06V 10/764* (2022.01); *G06T 7/11* (2017.01)

(58) Field of Classification Search
CPC ...... G06V 10/82; G06V 10/764; G06V 10/25; G06V 10/454; G06V 40/10; G06V 20/52; G06V 10/774; G06V 20/20; G06V 10/7715; G06V 20/46; G06V 2201/07; G06V 20/58; G06V 10/44; G06V 20/56; G06V 20/41;
(Continued)

(56) References Cited

U.S. PATENT DOCUMENTS 9,483,701 B1    11/2016    Kwatra et al.
2008/0158612 A1    7/2008    Iwasaki
(Continued)

FOREIGN PATENT DOCUMENTS

JP    S62-075205 A    4/1987
JP    2001-126055 A    5/2001
(Continued)

OTHER PUBLICATIONS

International Search Report for PCT Application No. PCT/JP2020/046958, mailed on Feb. 16, 2021.
(Continued)

Primary Examiner — Alex Kok S Liew
(74) Attorney, Agent, or Firm — Sughrue Mion, PLLC

(57) ABSTRACT

In order to enhance the accuracy of identifying an object included in an image, an information processing apparatus (10) includes: a first specifying section (11) that specifies, as a region in which the object in the image exists, a plurality of regions having respective different reference positions or respective different reference directions; a second specifying section (12) that specifies an identification region for the object on the basis of the plurality of regions specified by the first specifying section (11); and an identifying section (13) that identifies the object on the basis of the identification region specified by the second specifying section (12).

12 Claims, 19 Drawing Sheets

(58) Field of Classification Search
CPC ............. G06V 20/698; G06V 2201/03; G06V 40/161; G06V 10/806; G06V 10/255; G06V 20/64; G06V 20/695; G06T 2207/20084; G06T 2207/20081; G06T 7/11; G06T 2207/10016; G06T 7/0012; G06T 7/73; G06T 2207/30196; G06T 7/70; G06T 2210/12; G06T 7/74; G06T 2207/30096; G06T 2207/10081; G06T 2207/30232; G06T 2207/10028; G06T 2207/20076; G06T 7/246
See application file for complete search history.

(56) References Cited

U.S. PATENT DOCUMENTS

| | | | | |
|---|---|---|---|---|
| 2019/0332897 | A1* | 10/2019 | Chen | ............ G06T 7/215 |
| 2020/0294197 | A1 | 9/2020 | Kawahara et al. | |
| 2020/0349464 | A1* | 11/2020 | Lin | ............ G06N 3/084 |
| 2020/0372633 | A1* | 11/2020 | Lee | ............ G06N 3/045 |

FOREIGN PATENT DOCUMENTS

| | | |
|---|---|---|
| JP | 2002-056392 A | 2/2002 |
| JP | 2008-134921 A | 6/2008 |
| JP | 2013-088268 A | 5/2013 |
| JP | 2019-061505 A | 4/2019 |
| JP | 2020-149540 A | 9/2020 |
| JP | 2020-181255 A | 11/2020 |
| JP | 2020-197954 A | 12/2020 |

OTHER PUBLICATIONS

Liu et al., "Learning a Rotation Invariant Detector with Rotatable Bounding Box", arXiv:1711.09405v1. Nov. 26, 2017.

* cited by examiner

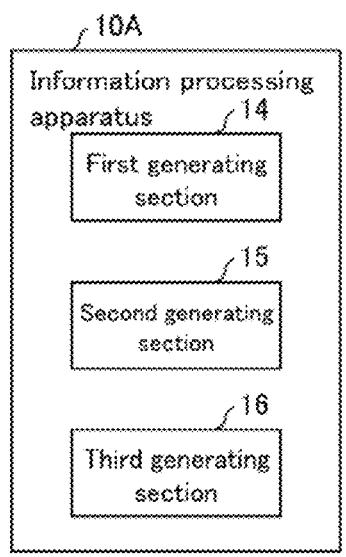
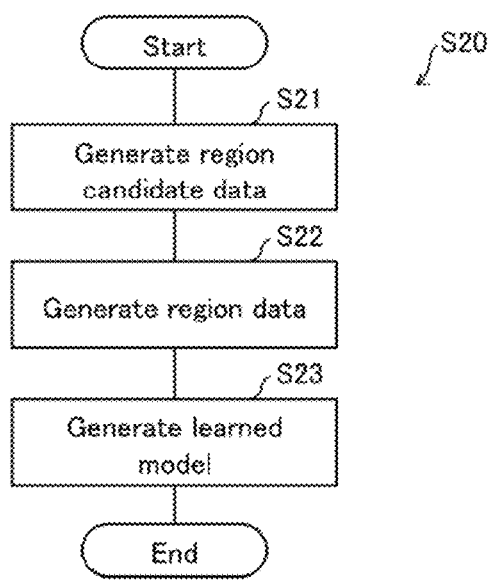

FIG. 10
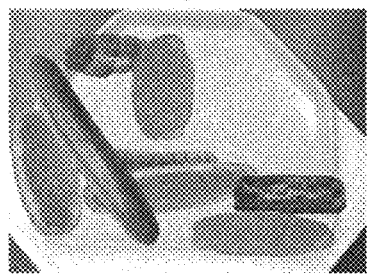
Img21
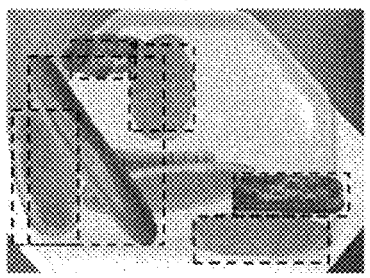
Img22
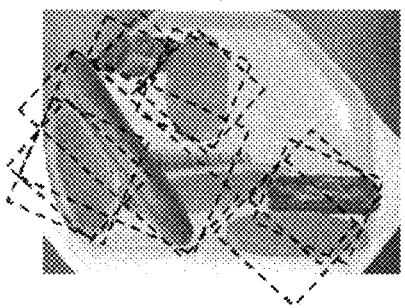
Img23
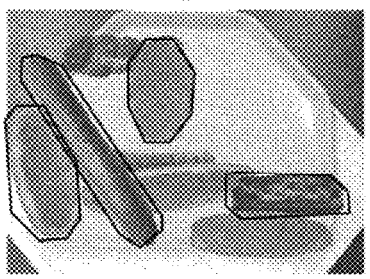
Img24

FIG. 17
Img31
Img32
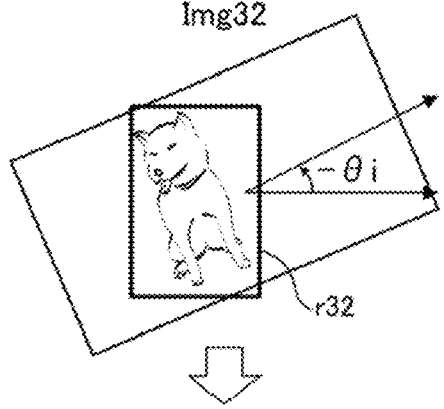
Img33
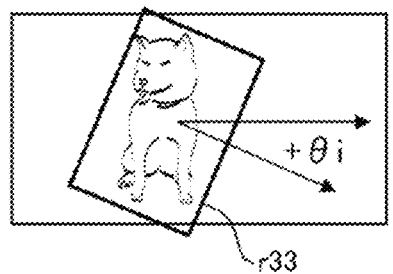

INFORMATION PROCESSING APPARATUS, INFORMATION PROCESSING METHOD, STORAGE MEDIUM

This application is a National Stage Entry of PCT/JP2020/046958 filed on Dec. 16, 2020, the contents of all of which are incorporated herein by reference, in their entirety.

TECHNICAL FIELD

The present invention relates to a technique for identifying an object included in an image.

BACKGROUND ART

In order to identify an object included in an image, there have been techniques of (a) specifying a region in which the object in the image exists and (b) identifying the object on the basis of image data corresponding to a part within the region thus specified. As one of such techniques, Non-Patent Literature 1 discloses a technique intended to improve the techniques of specifying the region in which the object in the image exists. According to the technique disclosed in Non-Patent Literature 1, the region in which the object exists is specified in consideration of rotation of the object.

CITATION LIST

Non-Patent Literature

[Non-patent Literature 1] Liu et al., "Learning a Rotation Invariant Detector with Rotatable Bounding Box", arXiv: 1711.09405v1, 26 Nov. 2017, https://arxiv.org/pdf/1711.09405.pdf

SUMMARY OF INVENTION

Technical Problem

According to the technique disclosed in Non-Patent Literature 1, however, a region to be specified is limited to a region having a quadrangular shape. Further, in a case of an object having a shape close to a circle, it is difficult to uniquely determine an angle of a region in which the object exists, disadvantageously. Therefore, in some cases, the technique disclosed in Non-Patent Literature 1 identifies the object included in the image with low accuracy.

An example aspect of the present invention was made in view of the above-described problems, and has an example object to provide a technique for enhancing the accuracy of identifying an object included in an image.

Solution to Problem

An information processing apparatus in accordance with an example aspect of the present invention includes at least one processor configured to execute: a first specifying process of specifying, as a region in which an object in an image exists, a plurality of regions having respective different reference positions or respective different reference directions; a second specifying process of specifying an identification region for the object on a basis of the plurality of regions specified in the first specifying process; and an identifying process of identifying the object on a basis of the identification region specified in the second specifying process.

An information processing apparatus in accordance with an example aspect of the present invention includes at least one processor configured to execute: a first generating process of generating region candidate data indicating a candidate for a region in which an object in an image exists; a second generating process of generating plural pieces of region data respectively indicating a plurality of regions in which the object in the image exists and which have respective different reference positions or respective different reference directions; and a third generating process of generating one or more learned models that (a) receive, as an input, image data indicating the image and the region candidate data and (b) output the plural pieces of region data.

An information processing method in accordance with an example aspect of the present invention includes: an information processing apparatus specifying, as a region in which an object in an image exists, a plurality of regions which have respective different reference positions or respective different reference directions; the information processing apparatus specifying an identification region for the object on a basis of the plurality of regions thus specified; and the information processing apparatus identifying the object on a basis of the identification region thus specified.

A program in accordance with an example aspect of the present invention is a program causing a computer to function as an information processing apparatus, the program causing the computer to execute: a first specifying process of specifying, as a region in which an object in an image exists, a plurality of regions having respective different reference positions or respective different reference directions; a second specifying process of specifying an identification region for the object on a basis of the plurality of regions specified in the first specifying process; and an identifying process of identifying the object on a basis of the identification region specified in the second specifying process.

A storage medium in accordance with an example aspect of the present invention is a storage medium in which a program is stored, the program causing a computer to function as an information processing apparatus, the program causing the computer to execute: a first specifying process of specifying, as a region in which an object in an image exists, a plurality of regions having respective different reference positions or respective different reference directions; a second specifying process of specifying an identification region for the object on a basis of the plurality of regions specified in the first specifying process; and an identifying process of identifying the object on a basis of the identification region specified in the second specifying process.

Advantageous Effects of Invention

In accordance with an example aspect of the present invention, it is possible to enhance the accuracy of identifying an object included in an image.

BRIEF DESCRIPTION OF DRAWINGS

FIG. 3 is a block diagram illustrating a configuration of an information processing apparatus in accordance with a second example embodiment of the present invention.

FIG. 4 is a flowchart illustrating a flow of an information processing method in accordance with the second example embodiment of the present invention.

FIG. 10 is a view illustrating an example of regions in accordance with the third example embodiment of the present invention.

FIG. 17 is a view illustrating a specific example of the method for generating the region data in accordance with the fifth example embodiment of the present invention.

DESCRIPTION OF EMBODIMENTS

First Example Embodiment

The following description will discuss a first example embodiment of the present invention in detail with reference to the drawings. The present example embodiment is a basic form of example embodiments described later.

<Configuration of Information Processing Apparatus>

Figure 1:
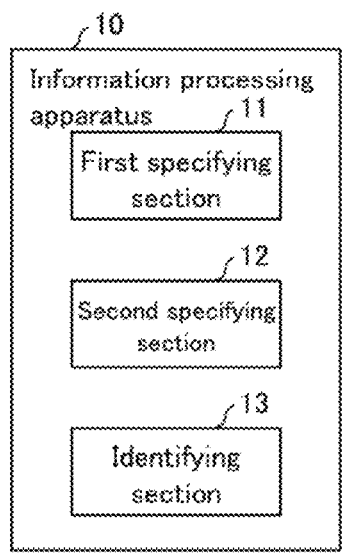
FIG. 1 is a block diagram illustrating a configuration of an information processing apparatus in accordance with a first example embodiment of the present invention.

The following will describe, with reference to FIG. 1, a configuration of an information processing apparatus 10 in accordance with the present example embodiment. FIG. 1 is a block diagram illustrating a configuration of the information processing apparatus 10. The information processing apparatus 10 identifies an object included in an image.

As shown in FIG. 1, the information processing apparatus includes a first specifying section 11, a second specifying section 12, and an identifying section 13. The first specifying section 11 realizes the first specifying means in the present example embodiment. The second specifying section 12 realizes the second specifying means in the present example embodiment. The identifying section 13 realizes the identifying means in the present example embodiment.

The first specifying section 11 specifies, as a region in which the object in the image exists, a plurality of regions having respective different reference positions or respective different reference directions. The region of the object is a region corresponding to the object included in the image. Examples of the region of the object include a polygonal, elliptical, or circular region including the object. Other examples of the region of the object include a quadrangular region circumscribing the object, an elliptical region circumscribing the object, or a circular region circumscribing the object.

The reference position or reference direction is a reference position or a reference direction used to specify a region in which the object exists. The reference direction is, for example, a direction of a reference axis of a quadrangle indicating a region of the object. The reference axis refers to an axis that is in parallel with two sides out of four sides defining the quadrangle. The reference position refers to a reference position of the quadrangle indicating the region of the object. In an example, a plurality of reference positions may be used for a single object.

The "specifying a plurality of regions having respective different reference directions" means, for example, specifying, as regions of the object, a plurality of quadrangles each of which circumscribes the object and which have respective different reference axes. The "specifying a plurality of regions having respective different reference positions" means, for example, specifying quadrangles circumscribing plural portions of the object into which the object is divided on the basis of the reference positions. Note that the process of specifying the plurality of regions which have respective different reference positions or respective different reference directions is not limited to the above-discussed process.

The second specifying section 12 specifies the region of the object on the basis of the plurality of regions specified by the first specifying section 11. In the description below, the region to be specified by the second specifying section 12 may also be called as an "identification region". The identification region is, for example, a projecting polygon circumscribing the object.

In an example, the second specifying section 12 specifies, as the identification region, a region (intersection) included in all of the plurality of regions specified by the first specifying section 11. In another example, the second specifying section 12 may specify, as the identification region, a region (union) including all of the plurality of regions specified by the first specifying section 11. In further another example, the second specifying section 12 may specify, as the identification region, a region including (a) a region included in all of one or more first regions out of the plurality of regions specified by the first specifying section 11 and (b) one or more second regions out of the plurality of regions specified by the first specifying section 11. Note that the process of specifying the identification region with use of either or both of the union and the intersection of two or more of the plurality of regions specified by the first specifying section 11 is not limited to the above-discussed process.

The identifying section 13 identifies the object on the basis of the identification region that the second specifying section 12 has specified in the image. In an example, the identifying section 13 may generate image data in which a region other than the identification region has been converted into a given background image and which is used to identify the object, and may identify the object on the basis of the image data thus generated. In the description below, for convenience of explanation, the region of the image which region is other than the identification region may also be called a "background region". The image data to be generated by the identifying section 13 may also be called an "identification image data". The background image may be, for example, a monotone image or an image including a color arrangement pattern including colors arranged in a given pattern. For example, the background image may be a while monotone image or a black monotone image. The background image may be, for example, an image of a background in image data used as training data in constructing a learned model used to identify an object. For example, in a case where the object included in the image data is a product such as bread, the background image may be an image of a tray on which the product is placed. A known technique can be employed to convert a color of the background region into a given background image.

<Flow of Information Processing Method>

Figure 2:
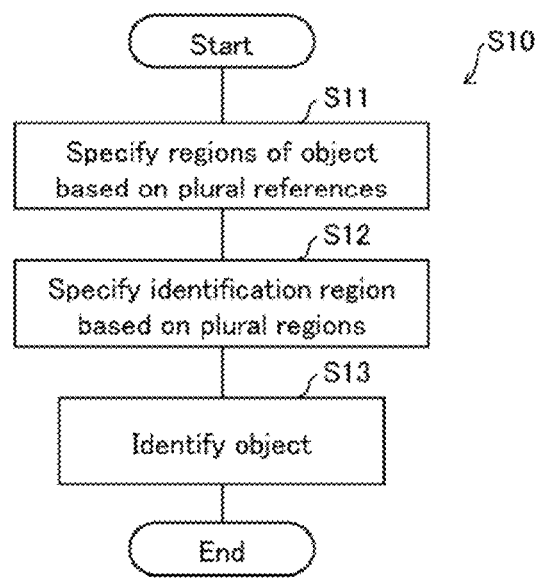
FIG. 2 is a flowchart illustrating a flow of an information processing method in accordance with the first example embodiment of the present invention.

The following will describe, with reference to FIG. 2, a flow of an information processing method S10 to be executed by the information processing apparatus 10 configured as above. FIG. 2 is a flowchart illustrating a flow of the information processing method S10. As shown in FIG. 2, the information processing method S10 includes steps S11 to S13.

(Step S11)

In step S11, the first specifying section 11 specifies, as a region of an object included in an image indicated by image data, a plurality of regions which have respective different reference positions or respective different reference directions.

(Step S12)

In step S12, the second specifying section 12 specifies an identification region for the object with use of either or both of a union and an intersection of two or more of the plurality of regions specified by the first specifying section 11 in step S11.

(Step S13)

In step S13, the identifying section 13 identifies the object in the image on the basis of the identification region specified by the second specifying section 12.

<Effects of First Example Embodiment>

As discussed above, the information processing apparatus 10 in accordance with the present example embodiment specifies an identification region on the basis of a plurality of regions of an object specified according to different references, and identifies the object on the basis of the identification region thus specified. Consequently, the identifying process with a suppressed effect of a background is realized. This makes it possible to enhance the accuracy of identifying an object.

Second Example Embodiment

The following description will discuss a second example embodiment of the present invention in detail with reference to the drawings. Note that members having identical functions to those of the first example embodiment are given identical reference signs, and a description thereof will be omitted.

<Configuration of Information Processing Apparatus>

The following will describe, with reference to FIG. 3, a configuration of an information processing apparatus 10A in accordance with the present example embodiment. FIG. 3 is a block diagram illustrating a configuration of the information processing apparatus 10A. The information processing apparatus 10A constructs one or more learned models used to specify a region of an object included in an image.

As shown in FIG. 3, the information processing apparatus 10A includes a first generating section 14, a second generating section 15, and a third generating section 16. The first generating section 14 realizes the first generating means in the present example embodiment. The second generating section 15 realizes the second generating means in the present example embodiment. The third generating section 16 realizes the third generating means in the present example embodiment.

The first generating section 14 generates region candidate data indicating a candidate for a region in which the object in the image exists. The candidate for the region is a region that is a candidate for the region in which the object included in the image exists. Examples of the candidate for the region of the object include a polygonal, elliptical, or circular region including the object. Other examples of the candidate for the region of the object include a quadrangular region circumscribing the object, an elliptical region circumscribing the object, or a circular region circumscribing the object.

The region candidate data is, for example, data obtained by inputting image data into a learned model constructed by machine learning. The learned model that estimates a region candidate is, for example, Region Proposal Network (RPN), which is used in object detection methods such as Faster Regions with CNN features (R-CNN). In other words, the region candidate data may be, for example, a region-of-interest (RoI) obtained by inputting image data into RPN.

The second generating section 15 generates plural pieces of region data respectively indicating a plurality of regions in which the object in the image exists and which have respective different reference positions or respective different reference directions. The region of the object is a region corresponding to the object included in the image. Examples of the region of the object include a polygonal region, an elliptical region, or a circular region including the object. Other examples of the region of the object include a quadrangular region circumscribing the object, an elliptical region circumscribing the object, or a circular region circumscribing the object.

The third generating section 16 generates one or more learned models that (a) receive, as an input, image data indicating an image and region candidate data and (b) output plural pieces of region data. In a case where the third generating section 16 generates a single learned model, the learned model is a learned model that outputs plural pieces of region data. Meanwhile, in a case where the third generating section 16 generates a plurality of learned models, the plurality of learned models output respective different region data, for example. The learned model is constructed by machine learning. The learned model can be realized by, for example, a model having a Convolutional Neural Network (CNN) model.

<Flow of Learned Model Generating Method>

The following will describe, with reference to FIG. 4, a flow of a method S20 of generating a learned model that is to be executed by the information processing apparatus 10A configured as above. FIG. 4 is a flowchart illustrating a flow of the method S20 of generating the learned model. As shown in FIG. 4, the method S20 of generating the learned model includes steps S21 to S23.

(Step S21)

In step S21, the first generating section 14 generates region candidate data indicating a candidate for a region in which an object in an image exists.

(Step S22)

In step S22, the second generating section 15 generates plural pieces of region data respectively indicating a plurality of regions in which the object in the image exists and which have respective different reference positions or respective different reference directions.

(Step S23)

In step S23, the third generating section 16 generates one or more learned models that (a) receive, as an input, image data indicating the image and the region candidate data and (b) output plural pieces of region data.

<Effects of Second Example Embodiment>

As discussed above, the information processing apparatus 10A in accordance with the present example embodiment generates one or more learned models that output plural pieces of region data. Thanks to the configuration in which the one or more learned models thus generated are used to identify an object, the information processing apparatus 10A in accordance with the present example embodiment can enhance the accuracy of identifying the object.

Third Example Embodiment

The following description will discuss a third example embodiment of the present invention in detail with reference to the drawings. Note that members having identical functions to those of the first and second example embodiments are given identical reference signs, and a description thereof will be omitted.

<Configuration of Information Processing Apparatus>

Figure 5:
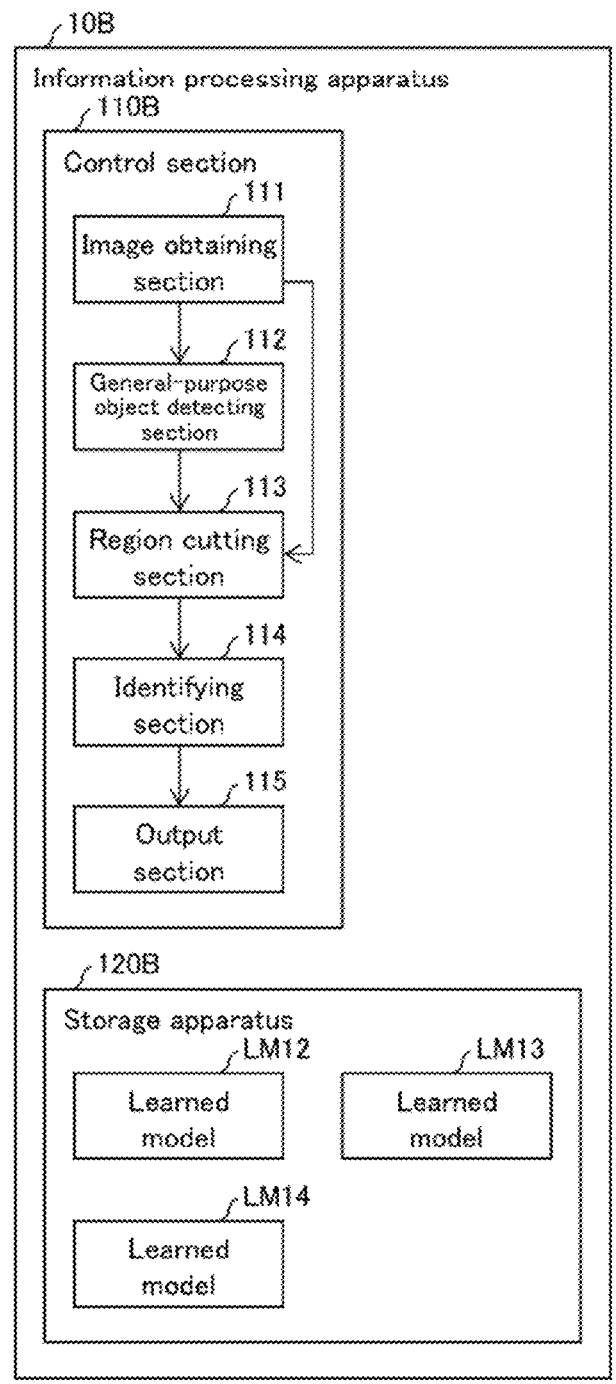
FIG. 5 is a block diagram illustrating a configuration of an information processing apparatus in accordance with a third example embodiment of the present invention.

The following will describe, with reference to FIG. 5, a configuration of an information processing apparatus 10B in accordance with the present example embodiment. FIG. 5 is a block diagram illustrating a configuration of the information processing apparatus 10B. The information processing apparatus 10B is an apparatus that identifies an object included in an image. As shown in FIG. 5, the information processing apparatus 10B includes a control section 110B and a storage apparatus 120B.

The control section 110B includes an image obtaining section 111, a general-purpose object detecting section 112, a region cutting section 113, an identifying section 114, and an output section 115. Details of these functional blocks included in the control section 110B will be described later.

The storage apparatus 120B has a learned model LM12 and a learned model LM13 stored therein.

The information processing apparatus 10B may include a communication section (not illustrated). The communication section transmits and receives information to/from another apparatus via a network (not illustrated) under control of the control section 110B.

(Image Obtaining Section)

The image obtaining section 111 obtains image data. The image data obtained by the image obtaining section 111 is data indicating an image, and is feature maps of the image, for example. The image obtaining section 111 may obtain the image data by reading the image data from the storage apparatus 120B. Alternatively, the image obtaining section 111 may obtain the image data by receiving the image data from another apparatus via the communication section. Further alternatively, the image obtaining section 111 may obtain the image data by executing a process of converting image data which is in a given file format into feature maps.

(General-Purpose Object Detecting Section)

The general-purpose object detecting section 112 detects a candidate for a region in which an object in an image exists (hereinafter, such a region will be referred to as a "region candidate"). In the present example embodiment, the general-purpose object detecting section 112 detects the candidate for the region of the object with use of the learned model LM12 constructed by machine learning.

The learned model LM12 receives, as an input, the image data indicating the image, and outputs region candidate data indicating the candidate for the region of the object. The learned model LM12 is, for example, RPN used in object detection methods such as Faster-RCNN. In other words, the general-purpose object detecting section 112 detects, as the candidate for the region of the object, RoI obtained by inputting, into RPN, the image data obtained by the image obtaining section 111. Note that the method in which the general-purpose object detecting section 112 detects the candidate for the region of the object is not limited to the above-discussed method. In an example, the general-purpose object detecting section 112 may detect the candidate for the region of the object with use of an existing method used in object detection methods such as Fast R-CNN. The general-purpose object detecting section 112 outputs the region candidate data indicating the candidate for the region of the object.

(Region Cutting Section)

The region cutting section 113 specifies the identification region for the object with use of the image data obtained by the image obtaining section 111 and the region candidate detected by the general-purpose object detecting section 112. The region cutting section 113 generates identification image data in which a region of the image which region is other than the identification region has been converted into a given background image. Details of the region cutting section 113 will be described later.

(Identifying Section)

The identifying section 114 identifies the object included in the identification region obtained as a result of cutting-out carried out by the region cutting section 113. In an example, the identifying section 114 identifies the object with use of the learned model LM14 (identification learned model) constructed by machine learning. The learned model LM14 is a model constructed by machine learning so that the learned model LM14 (a) receives, as an input, the image data and (b) outputs a result of estimation of the object included in the image data. The image data used to train the learned model LM14 can be, for example, image data obtained by image-capturing of the object that is a subject to be identified. The learned model LM14 can be realized by a model having a CNN structure, for example.

(Output Section)

The output section 115 outputs identification result data indicating the result of the identification carried out by the identifying section 114. In an example, the output section 115 may output the identification result data by causing the storage apparatus 120B to store the identification result data therein. In another example, the output section 115 may output the identification result data by transmitting the identification result data to another apparatus. In further another example, the output section 115 may output the identification result data by causing a display apparatus to display the identification result data. The output mode of the output section 115 is not limited to those described above, and may be any of other modes.

<Configuration of Region Cutting Section>

Figure 6:
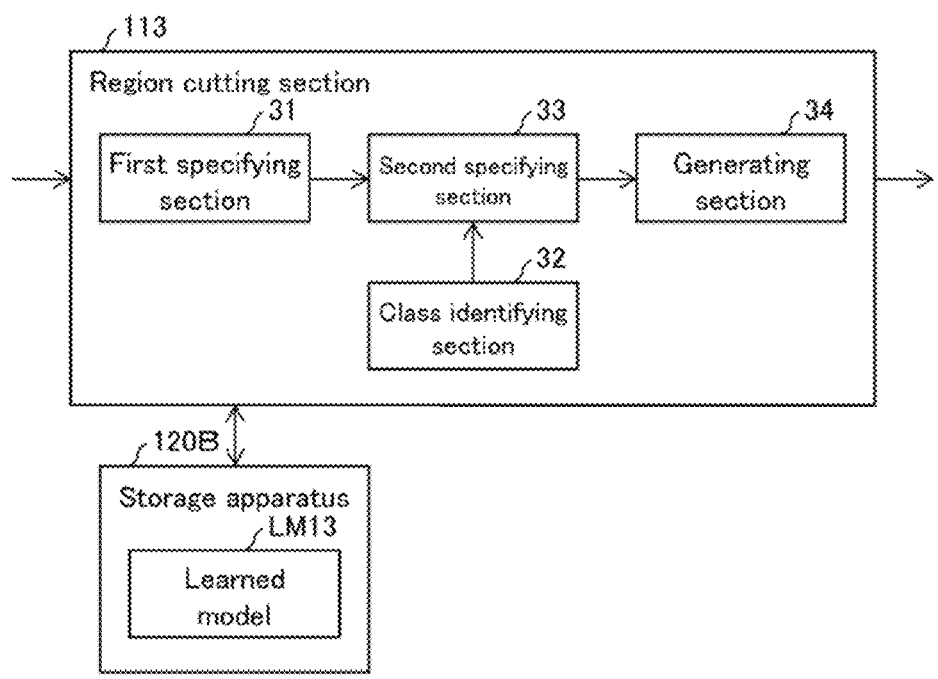
FIG. 6 is a block diagram illustrating a configuration of a region cutting section in accordance with the third example embodiment of the present invention.

FIG. 6 is a block diagram illustrating a configuration of the region cutting section 113. As shown in FIG. 6, the region cutting section 113 includes a first specifying section 31, a class identifying section 32, a second specifying section 33, and a generating section 34.

(First Specifying Section)

The first specifying section 31 specifies, as a region in which the object in the image exists, a plurality of regions having respective different reference positions or respective different reference directions. In an example, the first specifying section 31 specifies, as the region of the object, a region that is in the form of at least one of a quadrangle, a circle, an elliptic, and a square circumscribing the object.

In the present example embodiment, the first specifying section 31 specifies a plurality of regions of the object with use of the learned model LM13.

(Learned Model)

The learned model LM13 is a learned model constructed by machine learning. The learned model LM13 (a) receives, as an input, the image data indicating the image and the region candidate data indicating the candidate for the region in which the object in the image exists and (b) outputs plural pieces of region data indicating regions in which the object in the image exists. The plural pieces of region data output from the learned model LM13 are different in the reference position or the reference direction for the region extraction.

The region data includes, for example, parameters representing the position and the size of a circumscribing quadrangle of the object. Details of a method for specifying the region of the object with use of the learned model LM13 will be described later.

(Class Identifying Section)

On the basis of the image data obtained by the image obtaining section 111 and the region candidate data output by the general-purpose object detecting section 112, the class identifying section 32 shown in FIG. 6 outputs data indicating a result of identification of a class of the object included in the image. The data indicating the result of the identification of the class includes, for example, information indicating whether or not each of the plurality of regions is a background.

(Second Specifying Section)

The second specifying section 33 specifies an identification region for the object with use of either or both of a union and an intersection of two or more of the plurality of regions specified by the first specifying section 31. In an example, the second specifying section 33 specifies, as the identification region, an intersection of the plurality of regions specified by the first specifying section 31. The identification region is, for example, a projecting polygon circumscribing the object. The shape of the identification region is not limited to this, and may alternatively be a recessed polygon, for example.

In the process of specifying the identification region, the second specifying section 33 specifies the identification region on the basis of the classes identified for the regions by the class identifying section 32.

(Generating Section)

The generating section 34 generates identification image data in which a region of the image which region is other than the identification region specified by the second specifying section 33 has been converted into a given background image.

<Flow of Object Identifying Method>

Figure 7:
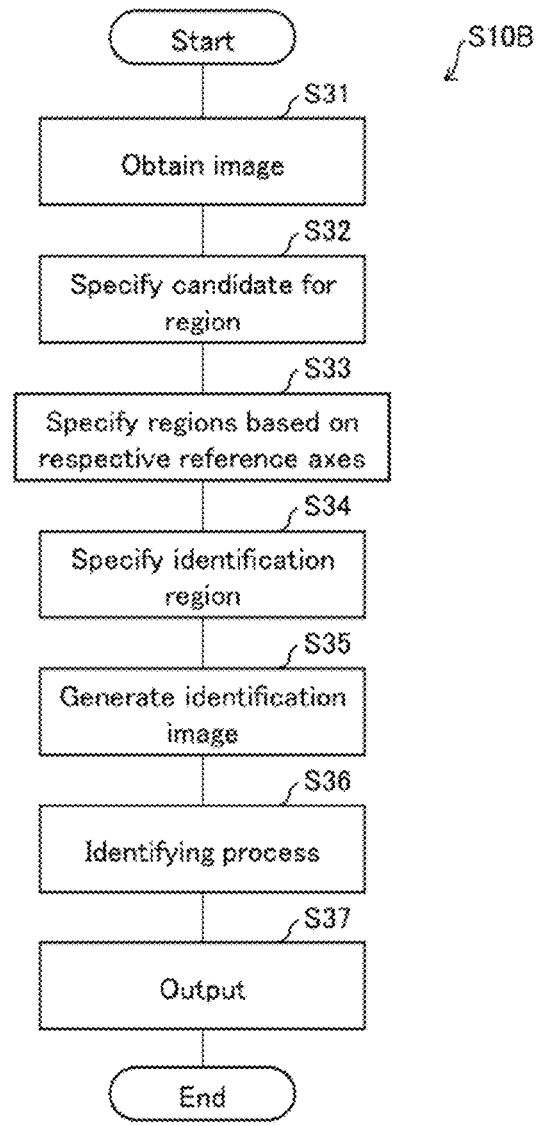
FIG. 7 is a flowchart illustrating a flow of a region cutting method and an object identifying method in accordance with the third example embodiment of the present invention.

The following will describe, with reference to FIG. 7, a flow of an object identifying method S10B to be executed by the information processing apparatus 10B configured as above. FIG. 7 is a flowchart illustrating a flow of the object identifying method S10B. As shown in FIG. 7, the object identifying method S10B includes steps S31 to S37.

(Step S31)

In step S31, the image obtaining section 111 obtains image data. In an example, the image obtaining section 111 executes a process of converting image data which is in a given file format into feature maps, and obtains a resultant as feature map image data.

(Step S32)

In step S32, the general-purpose object detecting section 112 specifies a region candidate, which is a rough region of the object included in the image. In an example, the general-purpose object detecting section 112 obtains region candidate data, which can be obtained by inputting the image data into the learned model LM12. More specifically, the general-purpose object detecting section 112 obtains RoI, which can be obtained by inputting the feature maps into RPN, for example. In a case where the image includes a plurality of objects, the general-purpose object detecting section 112 specifies candidates for regions of the plurality of objects.

(Step S33)

In step S33, the first specifying section 31 specifies, for each of the objects included in the image, a plurality of regions having reference axes tilted at respective different degrees. In an example, the first specifying section 31 specifies a plurality of regions of the object with use of the learned model LM13.

Figure 8:
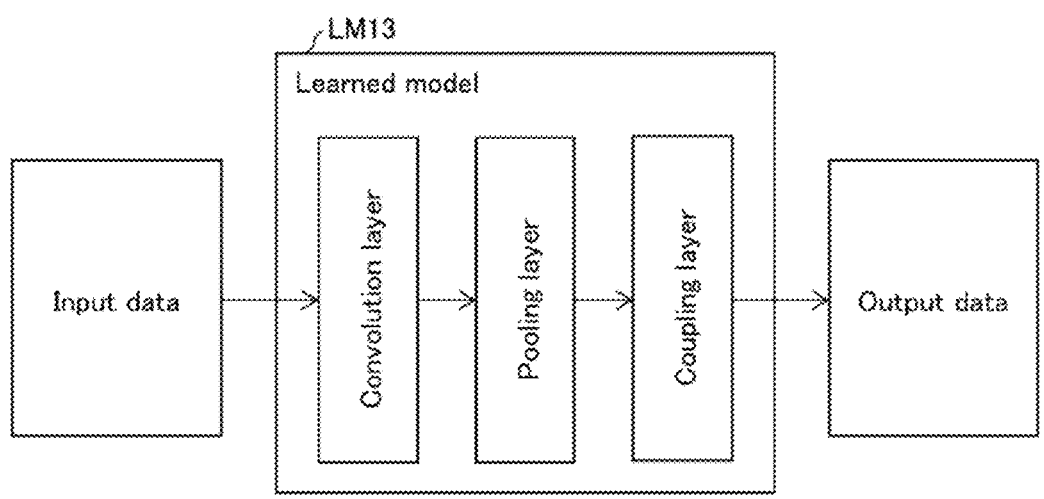
FIG. 8 is a view schematically illustrating an example of a learned model in accordance with the third example embodiment of the present invention.

FIG. 8 is a view schematically illustrating an example of the learned model LM13. As shown in FIG. 8, the learned model LM13 receives input data including the image data and the region candidate data.

The learned model LM13 is constituted by, e.g., a convolution layer, a pooling layer, and a coupling layer. In the convolution layer, the input data is filtered so that the information is convoluted. The data thus convoluted is input to the pooling layer so as to be subjected to pooling. This enhances recognition performance of the model with respect to a positional change of a feature in the data. The data having been subjected to the pooling is processed in the coupling layer so as to be converted into output data of the learned model LM13, and then is output. Specifically, the input data input to the learned model LM13 is caused to pass through the layers shown in FIG. 8 in this order, whereby the output data indicating the plurality of regions of the object included in the image is output.

Figure 9:
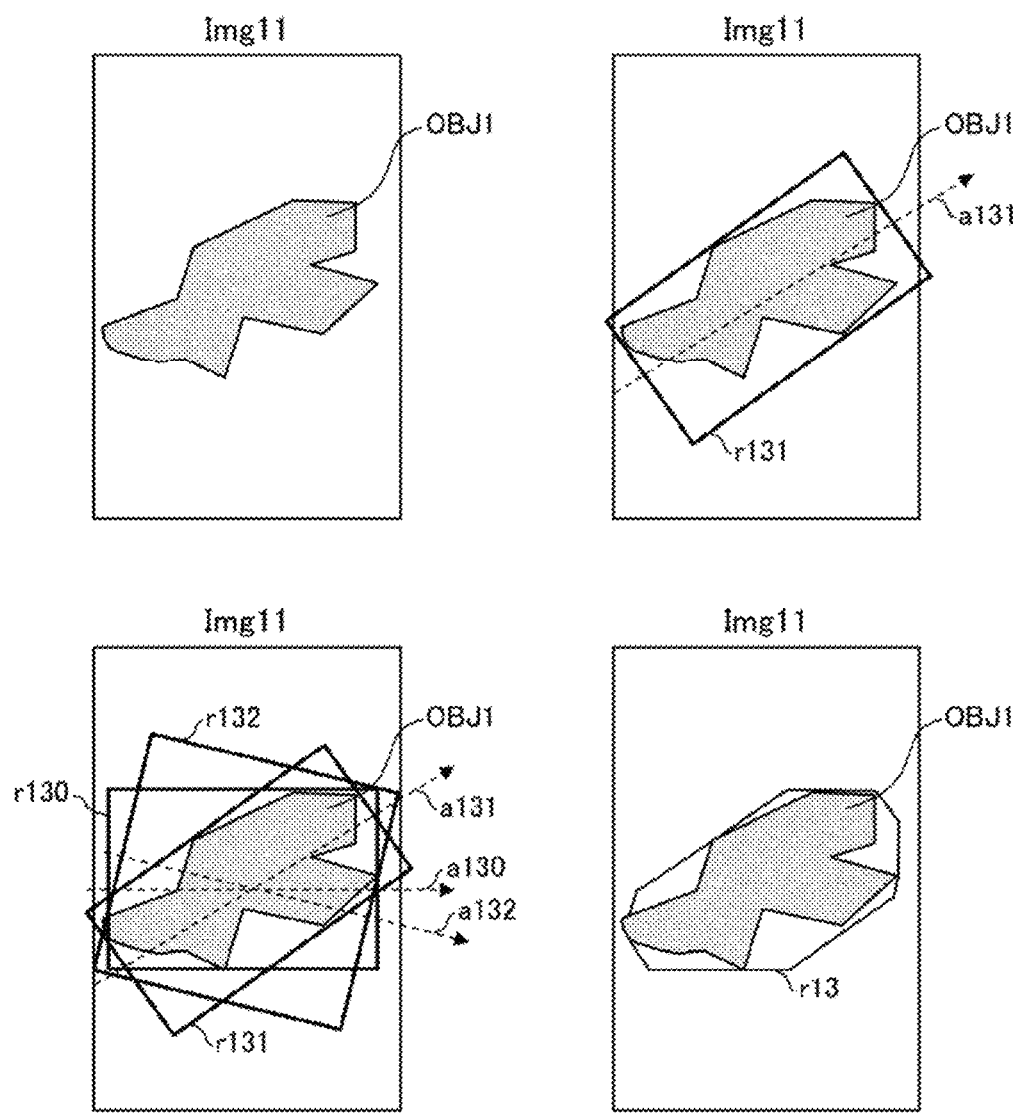
FIG. 9 is a view illustrating an example of regions in accordance with the third example embodiment of the present invention.

The learned model LM13 outputs output data indicating a plurality of regions whose regions to be cut have respective different reference axes. FIG. 9 is a view illustrating an example of the plurality of regions indicated by the output data output from the learned model LM13. In this example, the learned model LM13 outputs output data indicating three regions, i.e., regions r130 to r132. The region r130 is a region of a circumscribing quadrangle of an object OBJ1, the region having two sides being in parallel with a reference axis a130. The region r131 is a region of a circumscribing quadrangle of the object OBJ1, the region having two sides being in parallel with a reference axis a131. The region r132 is a region of a circumscribing quadrangle, the region having two sides being in parallel with a reference axis a132.

FIG. 10 is a view illustrating an example of a plurality of regions indicated by output data output from the learned model LM13 in a case where an image includes a plurality of objects. In FIG. 10, an image Img21 is an example of an image obtained by the image obtaining section 111. As shown in FIG. 10, the image Img21 includes a plurality of objects. In FIG. 10, an image Img22 shows examples of candidates for regions of the objects that the general-purpose object detecting section 112 has detected in the image Img21. An image Img23 shows examples of the plurality of regions indicated by the output data output from the learned model LM13, i.e., the plurality of regions specified by the first specifying section 31 on the basis of the detection result given by the general-purpose object detecting section 112. An image Img24 shows examples of identification regions of the respective objects specified by the second specifying section 33.

In the example of FIG. 10, the first specifying section 31 specifies, with use of the learned model LM13, the plurality of regions of the plurality of objects included in the image Img21. The second specifying section 33 specifies the identification regions of the plurality of objects on the basis of the result of the specification made by the first specifying section 31.

Figure 11:
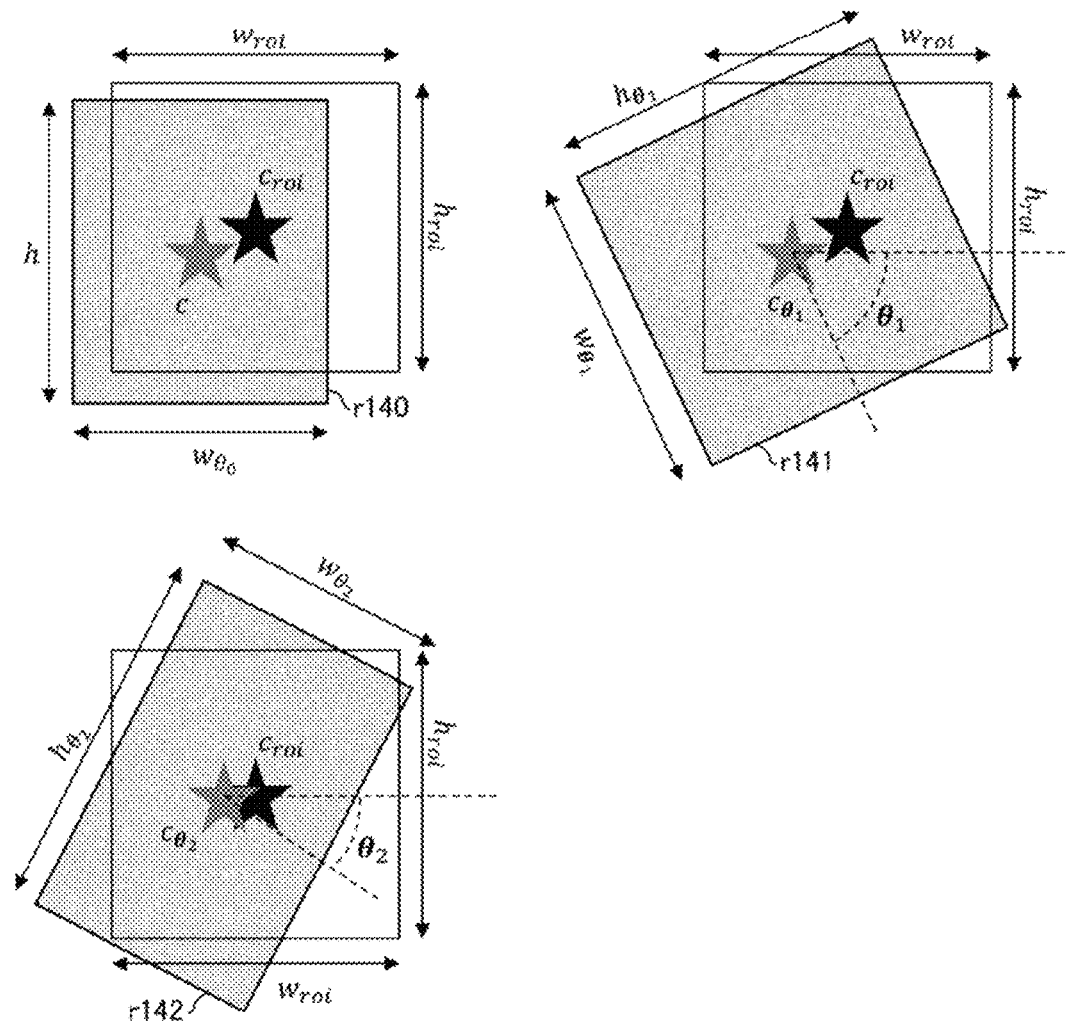
FIG. 11 is a view illustrating an example of parameters in accordance with the third example embodiment of the present invention.

The following will describe, with reference to the drawings, a specific example of parameters to which the learned model LM13 regresses. FIG. 11 is a view illustrating a specific example of the parameters to which the learned model LM13 regresses. In FIG. 11, a center point $c_{roi}$, a height $h_{roi}$, and a width $w_{roi}$ respectively indicate a center point, a height, and a width of a region candidate indicated by the region candidate data output by the general-purpose object detecting section 112. These parameters are the ones included in RoI obtained by RPN.

In FIG. 11, regions r140 to r142 are regions indicated by the output data output from the learned model LM13. Each of the regions r140 to r142 is represented by coordinates of the center point, a height of the region, and a width of the region. In FIG. 11, a center point $c_{\theta 0}$, a height $h_{\theta 0}$, and a width $w_{\theta 0}$ respectively indicate a center point, a height, and a width of the region r140. A center point $c_{\theta 1}$, a height $h_{\theta 1}$, and a width $w_{\theta 1}$ respectively indicate a center point, a height, and a width of the region r141. A center point $c_{\theta 2}$, a height $h_{\theta 2}$, a width $w_{\theta 2}$ respectively indicate a center point, a height, and a width of the region r142.

In the example of FIG. 11, the parameters to which the learned model LM13 regresses include four parameters, differences $dx_{\theta_{i,c}}$, $dy_{\theta_{i,c}}$, $dh_{\theta_{i,c}}$, and $dw_{\theta_{i,c}}$. In other words, in the example of FIG. 11, the region data output from the learned model LM13 includes these four parameters. The differences $dx_{\theta_{i,c}}$, $dy_{\theta_{i,c}}$, $dh_{\theta_{i,c}}$, and $dw_{\theta_{i,c}}$ are subjected to regression according to the following expressions 1 to 4, respectively.

$$dy_{\theta_i,c} = \frac{c_{roi}[y] - c_{\theta_i}[y]}{h_{roi}}$$

$$dx_{\theta_i,c} = \frac{c_{roi}[x] - c_{\theta_i}[x]}{w_{roi}}$$

-continued $$dh_{\theta_i,c} = \log\left(\frac{h_{\theta_i}}{h_{roi}}\right)$$

$$dw_{\theta_i,c} = \log\left(\frac{w_{\theta_i}}{w_{roi}}\right)$$

In the expressions 1 to 4, the coordinate $c_{roi}[x]$ is an x-coordinate of the center point $c_{roi}$ and the coordinate $c_{roi}[y]$ is a y-coordinate of the center point $c_{roi}$. The coordinate $c\theta_i[x]$ is an x-coordinate of the center point $c\theta_i$, and the coordinate $c\theta_i[y]$ is a y-coordinate of the center point $c\theta_i$. The letter "i" ($0 \le i \le 2$) is a subscript for a plurality of reference axes. The letter "c" is a subscript for a class index which is a result of identification carried out by the class identifying section 32. That is, in the example of FIG. 11, different neurons are assigned to respective classes.

Figure 12:
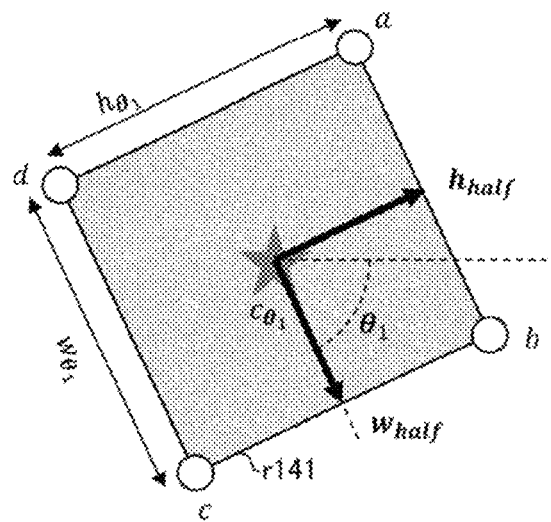
FIG. 12 is a view illustrating an example of a region in accordance with the third example embodiment of the present invention.

FIG. 12 is a view illustrating an example of a quadrangular region restored on the basis of the regression information. According to the above expressions 1 to 4, a center point $c_{\theta i}$, a height hoi, and a width $w_{\theta i}$ of a quadrangular region r13$i$ are calculated by the following expressions 5 to 8.

$$c_{\theta_i}[y] = c_{roi}[y] - dy_{\theta_i,c} \cdot h_{roi}$$

$$c_{\theta_i}[x] = c_{roi}[x] - dx_{\theta_i,c} \cdot w_{roi}$$

$$h_{\theta_i} = \exp(dh_{\theta_i,c}) \cdot h_{roi}$$

$$w_{\theta_i} = \exp(dw_{\theta_i,c}) \cdot w_{roi}$$

With use of the x-coordinate $c_{\theta i}[x]$, the y-coordinate $c_{\theta i}[y]$, the height $h_{\theta i}$, and the width $w_{\theta i}$ of the center point $c_{\theta i}$ of the quadrangular region calculated according to the expressions 5 to 8, the first specifying section 31 calculates vectors $h_{half}$ and $w_{half}$ for specifying apexes a, b, c, and d of the quadrangular region. The vectors $h_{half}$ and $w_{half}$ are represented by the following expressions 9 and 10, respectively.

$$h_{half} = \begin{bmatrix} 0.5 \cdot h_{\theta_i} \cdot \sin\theta_i \\ -0.5 \cdot h_{\theta_i} \cdot \cos\theta_i \end{bmatrix}$$

$$w_{half} = \begin{bmatrix} 0.5 \cdot w_{\theta_i} \cdot \cos\theta_i \\ 0.5 \cdot w_{\theta_i} \cdot \sin\theta_i \end{bmatrix}$$

The apexes a, b, c, and d of the quadrangular region to be specified by the first specifying section 31 are respectively represented by the following expressions using vectors $h_{half}$ and $w_{half}$.

$$a = h_{half} - w_{half}$$

$$b = h_{half} + w_{half}$$

$$c = -h_{half} + w_{half}$$

$$d = -h_{half} - w_{half}$$

The parameters to which the learned model LM13 regresses may be parameters other than those indicated above. For example, the parameters to which the learned model LM13 regresses may be a parameter representing a length of a diagonal line of the circumscribing quadrangle.
(Step S34)

In step S34 shown in FIG. 7, the second specifying section 33 specifies an identification region for the object with use of either or both of a union and an intersection of two or more of the plurality of regions specified by the first specifying section 31. In an example, the second specifying section 33 specifies, as the identification region, an intersection of the plurality of regions specified by the first specifying section 31. In other words, the second specifying section 33 specifies, as the identification region, a region in which the plurality of regions specified by the first specifying section 31 are superposed. In the example shown in FIG. 11, the second specifying section 33 specifies the identification region r13, which is an intersection of regions included in the circumscribing quadrangular regions r140 to r142.

The identification region to be specified by the second specifying section 33 is not limited to the intersection of the plurality of regions specified by the first specifying section 31. In an example, the identification region may be a region essentially including a given quadrangular region serving as a base. The identification region may be, for example, a region including (a) a region included in both the regions r140 and r141 and (b) the region r142 (i.e., a region serving as a base). Alternatively, the identification region may be, among the plurality of regions specified by the first specifying section 31, a region in which a threshold number or more of regions are superposed.

In an example, the identification region may be a region included in a predetermined number or more of quadrangular regions. The identification region may be, for example, a union of regions included in two or more quadrangular regions.

(Step S35)

In step S35, the generating section 34 generates identification image data in which a region of the image which region other than the identification region specified by the second specifying section 33 has been converted into a given background image. In an example, the generating section 34 generates identification image data indicating an identification image in which (a) a partial image in the identification region in the image is included and (b) a part other than the partial image is filled with a background color. For example, the background color is identical to a background color of training data learned by the learned model LM13. In an example, in a case where the image data used as training data in machine learning of the learned model LM13 is an image obtained by image-capturing of a product such as bread placed on a tray having a given color, the generating section 34 generates identification image data in which a region other than an identification region has been converted into the given color.

(Step S36)

In step S36, with use of the identification image data generated by the generating section 34, the identifying section 114 identifies the object included in the identification region cut out by the region cutting section 113. In an example, the identifying section 114 identifies the object on the basis of output data obtained by inputting the identification image data generated by the generating section 34 into the learned model LM14 constructed by machine learning.

(Step S37)

The output section 115 outputs identification result data indicating the result of the identification carried out by the identifying section 114. In an example, the identification result data output by the output section 115 is used in Point of sale (POS) system. For example, on the basis of the identification result data output by the output section 115, the POS system may calculate a bill of a product that a user wishes to purchase. Note that the identification result data output by the output section 115 is not limited to the one used in the POS system, and can be used in various other systems.

Incidentally, in an attempt to identify an object by detecting a circumscribing quadrangle of an object included in an image, a region within the circumscribing quadrangle may include a large area of a background in some cases. If this happens, the object may not be identified appropriately in some cases. For example, in a case where an image includes an elongated object oriented at a slanted angle, a circumscribing quadrangle of the object may include a large area of a background or another object in some cases. If this happens, the object may not be identified appropriately.

<Effects of Third Example Embodiment>

In accordance with the present example embodiment, the information processing apparatus 10B specifies regions of an object on the basis of different reference axes, specifies an identification region on the basis of the plurality of regions thus specified, and identifies the object with use of image data from which an area outside the identification region thus specified has been removed. This makes it possible to execute the identifying process with a suppressed effect of a background, thereby making it possible to improve the accuracy of identifying the object.

Further, in accordance with the present example embodiment, the information processing apparatus 10B specifies, with use of the learned model LM13, the regions of the object on the basis of the plurality of reference axes. Thus, the information processing apparatus 10B may input a single piece of image data into the learned model LM13. In other words, in performing the process of specifying the regions according to the respective plurality of reference axes, the information processing apparatus 10B does not need to execute, for example, a process of rotating the image according to the reference axis. This can reduce the cost of calculation in the process of specifying the regions.

Moreover, in accordance with the present example embodiment, the first specifying section 31 collectively executes estimation processes of a plurality of circumscribing quadrangles. Thus, with the present example embodiment, it is possible to reduce a period of time required for the estimation processes, as compared to a case where the estimation processes are executed sequentially.

Further, with the present example embodiment, the learned model LM13, which is to be used by the region cutting section 133, is provided independently of the learned model LM14, which is to be used by the identifying section 114. Therefore, even in a case where an object that is a subject to be identified is added, for example, the learned model LM14 may be trained again and the learned model LM13 does not have to be trained again.

The description of the above example embodiment has dealt with the case where the information processing apparatus 10B executes the processes in steps S31 to S37 shown in FIG. 7. The information processing apparatus 10B may execute part of steps S31 to S37. In an example, the information processing apparatus 10B may execute the processes in steps S31 to S34 and output an identification region specified in step 34. In other words, an apparatus that is to execute steps S31 to S34 in FIG. 7 and an apparatus that is to execute steps S35 to S37 in FIG. 7 may be provided separately from each other.

Fourth Example Embodiment

The following description will discuss a fourth example embodiment of the present invention in detail with reference to the drawings. Note that members having identical functions to those of the first to third example embodiments are given identical reference signs, and a description thereof will be omitted.

An information processing apparatus 10C in accordance with the present example embodiment includes a region cutting section 113C in place of the region cutting section 113 of the third example embodiment.

Figure 13:
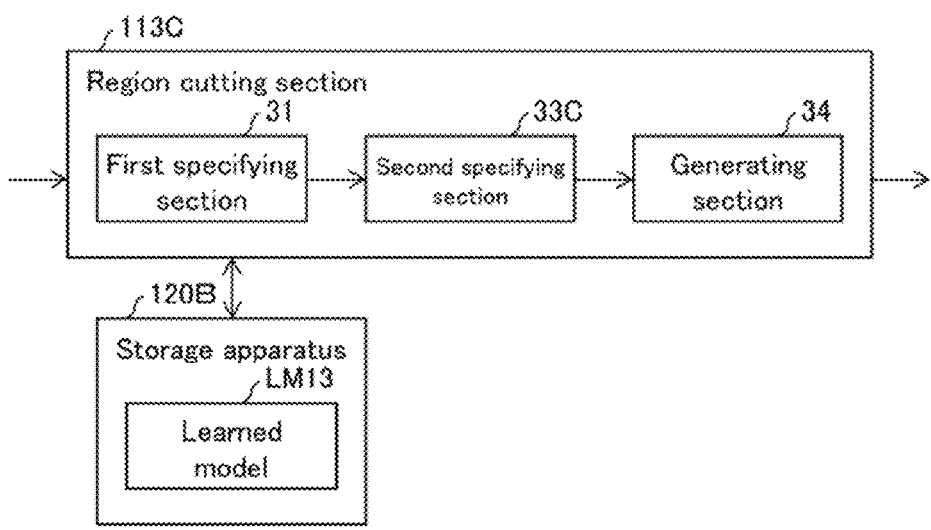
FIG. 13 is a block diagram illustrating a configuration of a region cutting section in accordance with a fourth example embodiment of the present invention.

FIG. 13 is a block diagram illustrating a configuration of the region cutting section 113C. The region cutting section 113C differs from the region cutting section 113 in that the region cutting section 113C does not include the class identifying section 32 and includes a second specifying section 33C in place of the second specifying section 33.

The second specifying section 33C specifies an identification region for an object with use of either or both of a union and an intersection of two or more of a plurality of regions specified by a first specifying section 31. In an example, the second specifying section 33 specifies, as the identification region, an intersection of the plurality of regions specified by the first specifying section 31.

In accordance with the present example embodiment, the information processing apparatus 10C specifies regions of an object on the basis of different reference axes, specifies an identification region on the basis of the plurality of regions thus specified, and identifies the object with use of image data from which an area outside the identification region thus specified has been removed. This makes it possible to execute the identifying process with a suppressed effect of a background, thereby making it possible to improve the accuracy of identifying an object.

Fifth Example Embodiment

The following description will discuss a fifth example embodiment of the present invention in detail with reference to the drawings. Note that members having identical functions to those of the first to fourth example embodiments are given identical reference signs, and a description thereof will be omitted.

<Configuration of Information Processing Apparatus>

Figure 14:
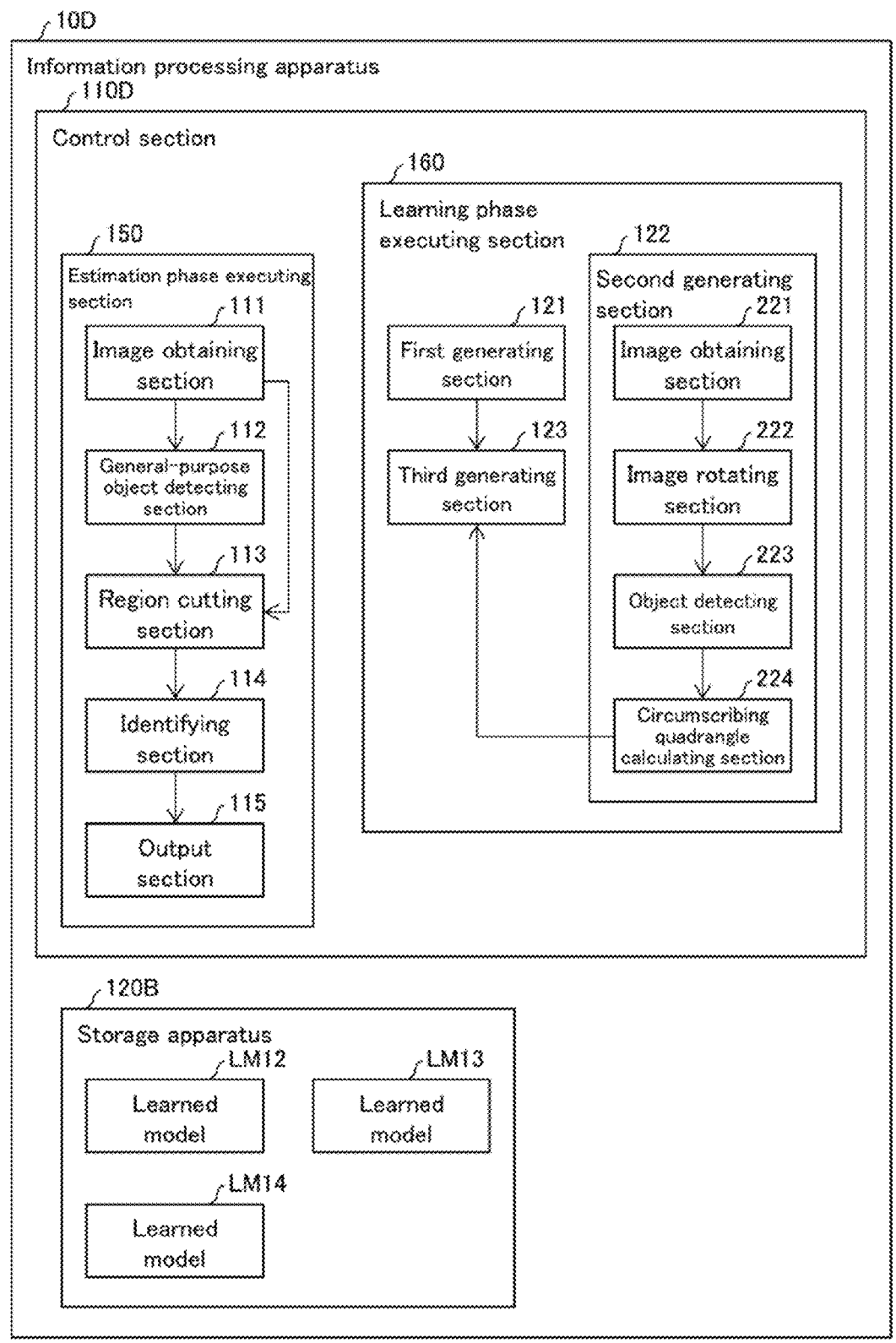
FIG. 14 is a block diagram illustrating a configuration of an information processing apparatus in accordance with a fifth example embodiment of the present invention.

FIG. 14 is a block diagram illustrating a configuration of an information processing apparatus 10D in accordance with the present example embodiment. The information processing apparatus 10D includes a control section 110D in place of the control section 110B of the above-described third example embodiment. The control section 110D includes an estimation phase executing section 150 and a learning phase executing section 160.

The estimation phase executing section 150 identifies an object included in an image. An image obtaining section 111, a general-purpose object detecting section 112, a region cutting section 113, an identifying section 114, and an output section 115 included in the estimation phase executing section 150 are identical to those disclosed in the above-described third example embodiment. Therefore, these sections are given identical reference signs, and a description thereof will be omitted.

The learning phase executing section 160 includes a first generating section 121, a second generating section 122, and a third generating section 123.

(First Generating Section)

The first generating section 121 generates region candidate data indicating a candidate for a region of the object included in the image. In the present example embodiment, the first generating section 121 generates region candidate data obtained by inputting image data into a learned model LM12. The region candidate data to be output from the learned model LM12 is, for example, RoI, which is an output of RPN.

(Second Generating Section)

The second generating section 122 generates plural pieces of region data respectively indicating a plurality of regions in which the object in the image exists and which have respective different reference positions or respective different reference directions. The method for generating the region data, carried out by the second generating section 122, will be described later.

(Third Generating Section)

The third generating section 123 generates a learned model(s) LM13 that derive(s) plural pieces of region data from input data.

<Configuration of Second Generating Section>

The second generating section 122 includes an image obtaining section 221, an image rotating section 222, an object detecting section 223, and a circumscribing quadrangle calculating section 224.

(Image Obtaining Section)

The image obtaining section 221 obtains the image data. The image data obtained by the image obtaining section 221 is data indicating an image, and is feature maps of the image, for example. The image obtaining section 221 may obtain the image data by reading the image data from the storage apparatus 120B. Alternatively, the image obtaining section 221 may obtain the image data by receiving the image data from another apparatus via the communication section. Further alternatively, the image obtaining section 221 may obtain the image data by executing a process of converting image data which is in a given file format into feature maps.

(Image Rotating Section)

The image obtaining section 222 generates a rotated image which is a resultant of rotating, in a given direction, the image indicated by the image data obtained by the image obtaining section 221.

(Object Detecting Section)

The object detecting section 223 specifies a region of the object included in the rotated image generated by the image rotating section 222. In an example, the object detecting section 223 specifies the region of the object on the basis of the region data obtained by inputting the image data into the learned model. In an example, the learned model is a learned model that (a) receives, as an input, image data and (b) outputs region data, and can be realized by a model having a CNN structure. The method for specifying the region of the object, carried out by the object detecting section 223, can be an existing one.

(Circumscribing Quadrangle Calculating Section)

The circumscribing quadrangle calculating section 224 generates, as the region data, data indicating a rotated region which is a resultant of rotating the region in a direction reverse to the given direction.

<Flow of Learned Model Generating Method>

Figure 15:
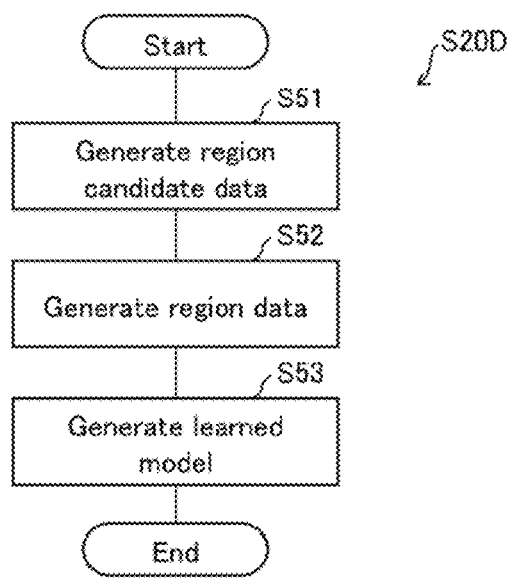
FIG. 15 is a flowchart illustrating a flow of a method for generating a learned model in accordance with the fifth example embodiment of the present invention.

The following will describe, with reference to FIG. 15, a flow of a method S20D of generating a learned model, which is to be executed by the information processing apparatus 10D configured as above. FIG. 15 is a flowchart illustrating a flow of the method S20D of generating the learned model. As shown in FIG. 15, the method S20D of generating the learned model includes steps S51 to S53.

(Step S51)

In step S51, the first generating section 121 generates input data including image data indicating an image and region candidate data indicating a candidate for a region of an object included in the image. The number of objects included in the image indicated by the image data may be one or more.
(Step S52)

In step S52, the second generating section 122 generates plural pieces of region data respectively indicating a plurality of regions in which the object in the image exists and which have respective different reference positions or respective different reference directions. The method for generating the plural pieces of region data, carried out by the second generating section 122, will be described later.
(Step S53)

In step S53, the third generating section 123 generates the learned model LM13 that derives plural pieces of region data from input data. In other words, the third generating section 123 constructs the learned model LM13 by machine learning that uses, as training data, the input data and the plural pieces of region data. The input data included in the training data includes (a) the image data indicating the image and (b) the region candidate data that the first generating section 121 has generated for the image data. The plural pieces of region data included in the training data are the plural pieces of region data generated by the second generating section. The image data used to train the learned model LM13 can be, for example, plural pieces of image data obtained by image-capturing of the object that is the subject to be identified. The image data used to train the learned model LM13 may be identical to the image data used to train the learned model LM14.

<Flow of Region Data Generating Method>

Figure 16:
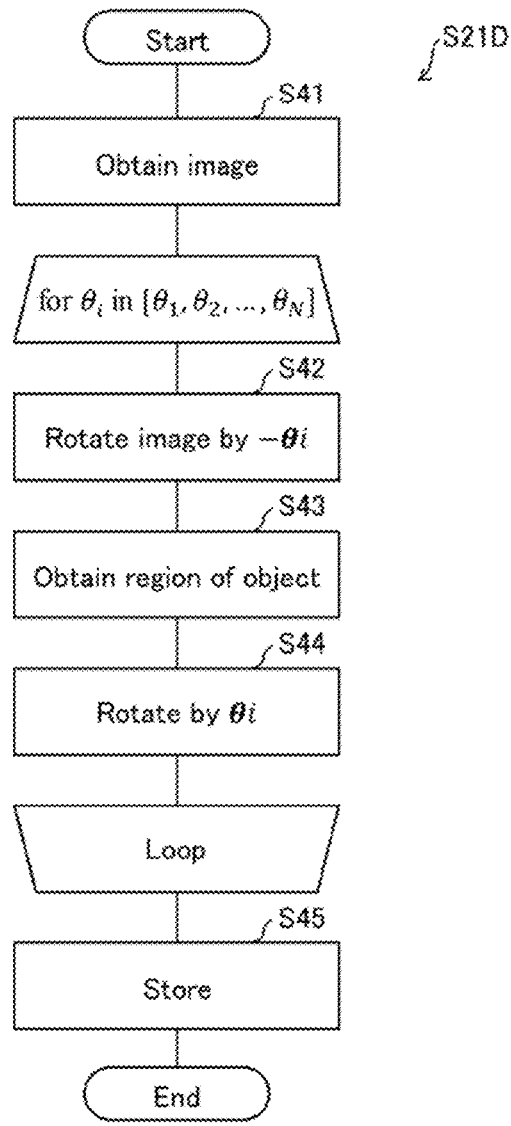
FIG. 16 is a flowchart illustrating a flow of a method for generating region data in accordance with the fifth example embodiment of the present invention.

FIG. 16 is a flowchart illustrating a flow of a method S21D of generating plural pieces of region data, which is to be executed by the second generating section 122. As shown in FIG. 16, the method S21D of generating the plural pieces of region data includes steps S41 to S45.
(Step S41)

In step S41, the image obtaining section 221 obtains the image data.
(Step S42)

For each angle $\theta_i$ (i is an integer satisfying 1≤i≤N), the second generating section 122 executes the processes of steps S42 to S44 to generate the plural pieces of region data. In the present example embodiment, the plural pieces of region data respectively indicate a plurality of regions having reference axes tilted at respective different degrees.

First, in step S42, the image rotating section 222 generates an image which is a resultant of rotating, in a given direction by an angle ($-\theta_i$), an image indicated by the image data obtained by the image obtaining section 221 (hereinafter, such an image will be referred to as a "rotated image").

FIG. 17 is a view illustrating a specific example of a method for generating a region data. In FIG. 17, an image Img31 is an image before rotation. An image Img32 is a rotated image which is a resultant of the image rotating section 222 rotating the image Img31 by the angle ($-\theta_i$).
(Step S43)

In step S43 in FIG. 16, the object detecting section 223 specifies a region of the object included in the rotated image generated by the image rotating section 222.
(Step S44)

In step S44, the circumscribing quadrangle calculating section 224 generates region data indicating a rotated region which is a resultant of rotating the region by an angle (+$\theta_i$). A region r33 shown in FIG. 17 is a region which is a resultant of rotating, by the angle (+$\theta_i$), a region r32 that the object detecting section 223 has specified in the image Img32.

The second generating section 122 executes, for each angle $\theta_i$ (i is an integer satisfying 1≤i≤N), the processes in steps S42 to S44. Consequently, the second generating section 122 specifies plural pieces of region data for the single object included in the image.
(Step S45)

In step S45 in FIG. 16, the circumscribing quadrangle calculating section 224 stores the specified plural pieces of region data in the storage apparatus 120B.

<Effects of Fourth Example Embodiment>

As described above, in accordance with the present example embodiment, the information processing apparatus 10D generates plural pieces of region data respectively indicating a plurality of regions in which an object in an image exists and which have respective different reference positions or respective different reference directions. Further, the information processing apparatus 10D generates a learned model having machine-learned by using the generated region data as training data. By using the learned model to identify the object, the identifying process with a suppressed effect of a background is realized.

The method for generating region data, carried out by the information processing apparatus 10D, is not limited to those indicated in the above-described example embodiments. In an example, the information processing apparatus 10D may calculate a rotated circumscribing quadrangle on the basis of annotation for segmentation.

Sixth Example Embodiment

The following description will discuss a sixth example embodiment of the present invention in detail with reference to the drawings. Note that members having identical functions to those of the first to fifth example embodiments are given identical reference signs, and a description thereof will be omitted.

<Configuration of Information Processing Apparatus>

Figure 18:
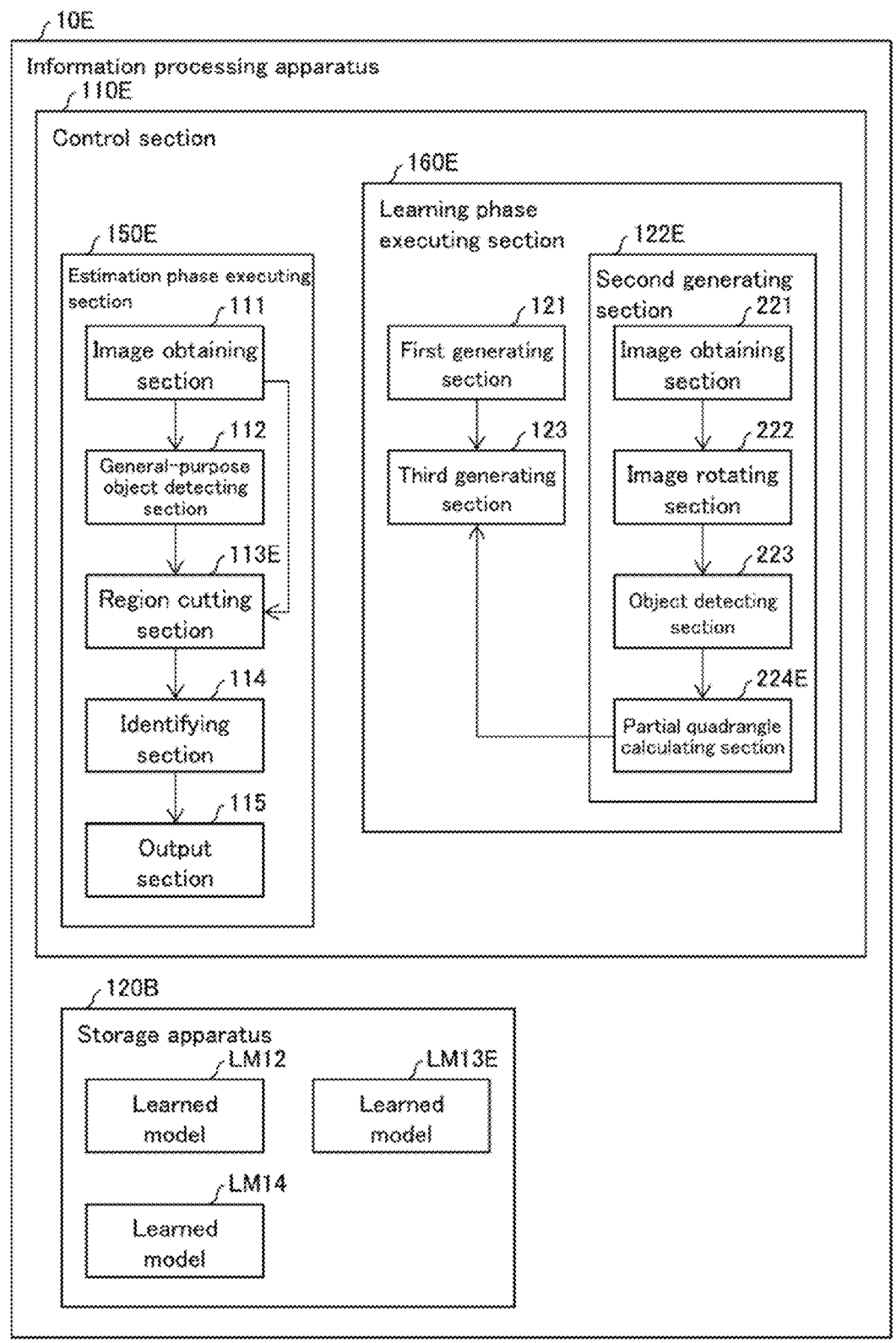
FIG. 18 is a block diagram illustrating a configuration of an information processing apparatus in accordance with a sixth example embodiment of the present invention.

FIG. 18 is a block diagram illustrating a configuration of an information processing apparatus 10E. The information processing apparatus 10E includes a control section 110E in place of the control section 110D of the above-described fifth example embodiment. The control section 110E includes an estimation phase executing section 150E and a learning phase executing section 160E.

The estimation phase executing section 150E includes a region cutting section 113E in place of the region cutting section 113 included in the estimation phase executing section 150. The learning phase executing section 160E includes a second generating section 122E in place of the second generating section 122 included in the learning phase executing section 160.
(Region Cutting Section)

The region cutting section 113E specifies an identification region for an object with use of image data obtained by an image obtaining section 111 and a candidate for a region detected by a general-purpose object detecting section 112. Details of the region cutting section 113 will be described later.
(Second Generating Section)

The second generating section 122E includes a partial quadrangle calculating section 224E in place of the circumscribing quadrangle calculating section 224 of the above-described fifth example embodiment. The partial quadrangle calculating section 224E generates region data included in training data for a learned model LM13E. In the present example embodiment, plural pieces of region data respectively indicate a plurality of regions which have respective different reference positions.

(Configuration of Region Cutting Section)

Figure 19:
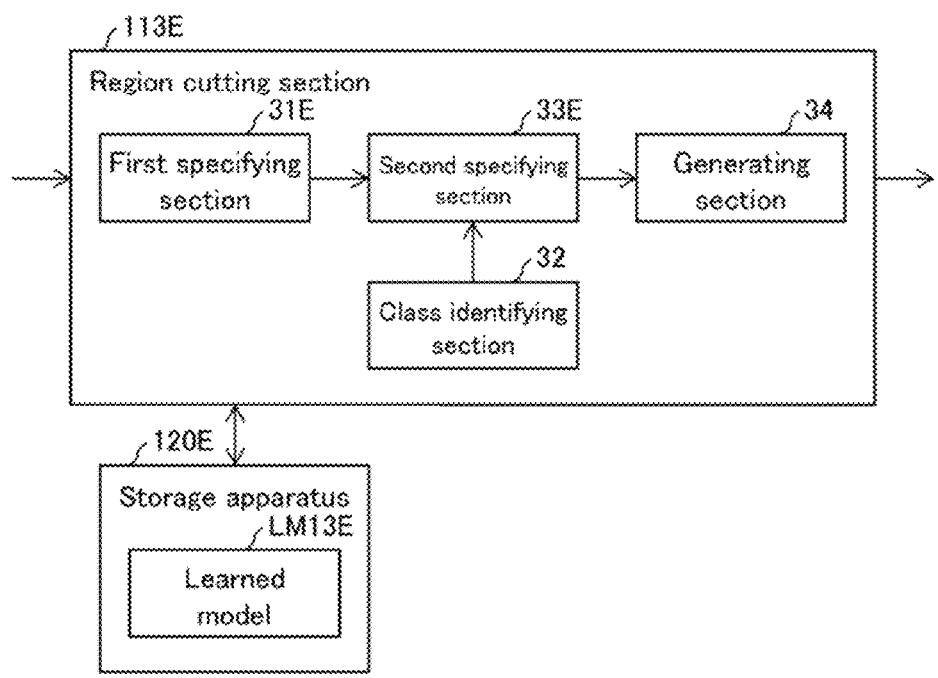
FIG. 19 is a block diagram illustrating a configuration of a region cutting section in accordance with the sixth example embodiment of the present invention.

FIG. 19 is a block diagram illustrating an example of a configuration of the region cutting section 113E. The region cutting section 113E includes a first specifying section 31E, a class identifying section 32, a second specifying section 33E, and a generating section 34. The first specifying section 31E specifies a plurality of regions of the object on the basis of the plurality of reference positions. The second specifying section 33E specifies, as the identification region for the object, a region (union) including the plurality of regions thus specified.

The first specifying section 31E specifies the plurality of regions of the object included in the image on the basis of the respective different reference positions. To be more specific, the first specifying section 31E specifies the regions of the object on the basis of a result of estimation carried out with use of the learned model LM13E.

The learned model LM13E is a learned model constructed by machine learning so as to output plural pieces of region data indicating regions of the object included in the image. The plural pieces of region data output from the learned model LM13E have respective different reference positions relating to extraction of the regions.

Input data for the learned model LM13E includes image data and region candidate data. Output data for the learned model LM13E includes the plural pieces of region data indicating the regions of the object. Each piece of region data includes, for example, parameters representing the position and the size of a circumscribing quadrangle of the object.

Figure 20:
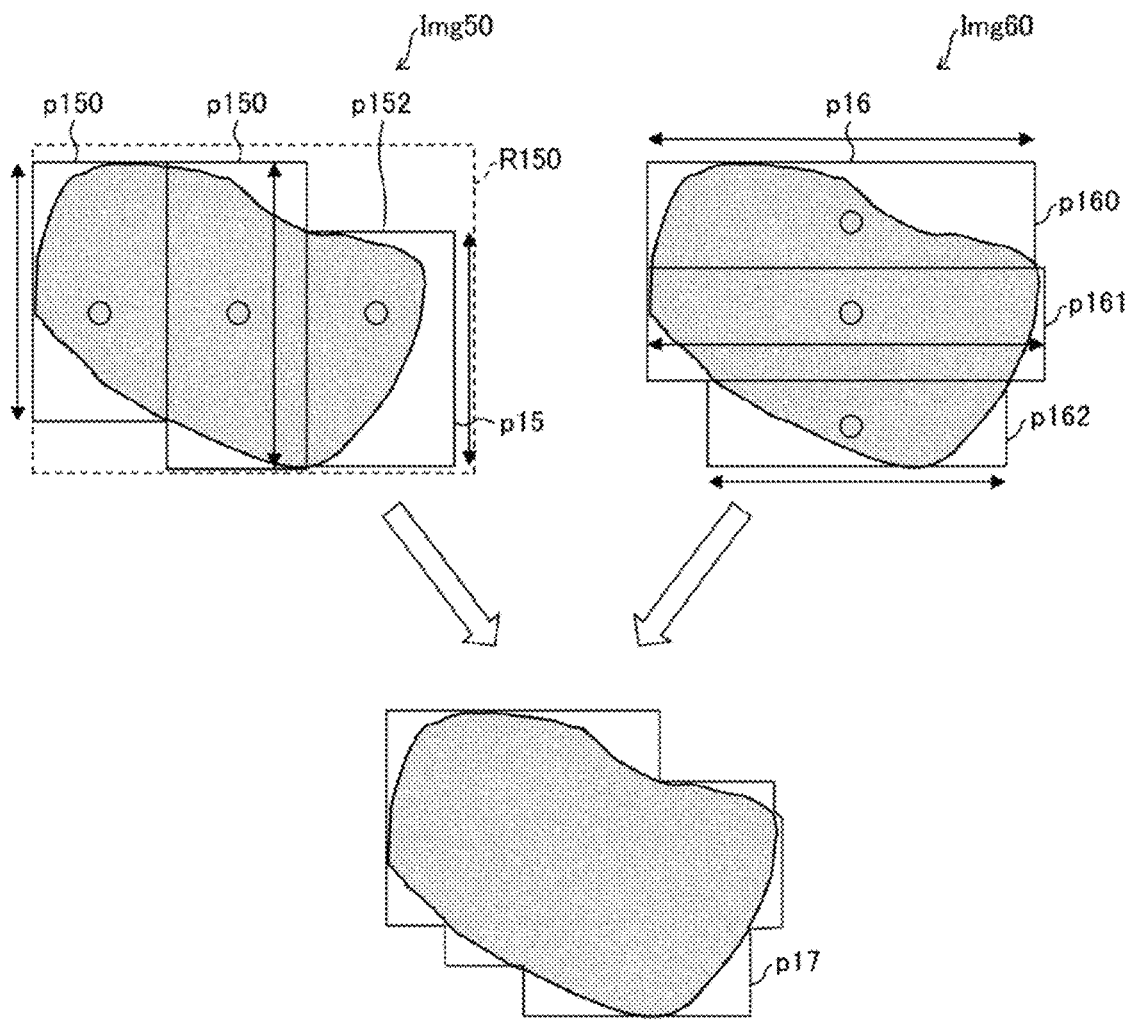
FIG. 20 is a view illustrating a specific example of a method for cutting out a region in accordance with the sixth example embodiment of the present invention.

FIG. 20 is a view illustrating a specific example of a method for cutting out a region. In FIG. 20, image data Img50 shows a specific example of a first region cutting method, whereas image data Img52 shows a specific example of a second region cutting method. In this example, the learned model LM13E outputs output data indicating partial regions p150 to p152. The partial region p150 is a partial region which is a resultant of dividing, on the basis of a given reference position, a region candidate R150 indicated by region candidate data. The partial region p151 is a partial region which is a resultant of dividing, on the basis of a given reference position, the region candidate R150 indicated by the region candidate data. The partial region p152 is a partial region which is a resultant of dividing, on the basis of a given reference position, the region candidate R150 indicated by the region candidate data.

In the example of image data Img60, the partial region p160 is a partial region p160 which is a resultant of dividing, on the basis of a given reference position, a region candidate indicated by region candidate data. The partial region p161 is a partial region, which is a resultant of dividing, on the basis of a given reference position, the region candidate R160 indicated by the region candidate data. The partial region p162 is a partial region which is a resultant of dividing, on the basis of a given reference position, the region candidate R160 indicated by the region candidate data.

The second specifying section 33E specifies, as the identification region for the object, a region including the plurality of regions specified by the first specifying section 31E. In an example, the second specifying section 33E specifies, as the identification region, a region p15 including the partial regions p150 to p152. In another example, the second specifying section 33E may specify, as the identification region, a region p16 including the partial regions p160 to p162. In further another example, the second specifying section 33E may specify, as the identification region, a region p17 that is an intersection of the regions p15 and p16.

In a learning phase of the learned model LM13E, the partial quadrangle calculating section 224E generates, for example, the pieces of region data indicating the partial regions p150 to p152 shown in FIG. 20 or the pieces of region data indicating the partial regions p160 to p162. In an example, the partial quadrangle calculating section 224E may generate pieces of region data indicating three regions into which the region of the object detected by the object detecting section 223 are divided along given axis directions (for example, x-axis direction, y-axis direction, etc.). In this case, the third generating section 123 causes the learned model LM13E to machine-learn by using, as training data, the plural pieces of region data generated by the partial quadrangle calculating section 224E.

In accordance with the present example embodiment, the information processing apparatus 10E specifies regions of an object on the basis of different reference positions, specifies an identification region including the plurality of regions thus specified, and identifies the object with use of image data from which an area outside the identification region thus specified has been removed. This makes it possible to execute the identifying process with a suppressed effect of a background, thereby making it possible to improve the accuracy of identifying an object.

Seventh Example Embodiment

The following description will discuss a seventh example embodiment of the present invention in detail with reference to the drawings. Note that members having identical functions to those of the first to sixth example embodiments are given identical reference signs, and a description thereof will be omitted.

Figure 21:
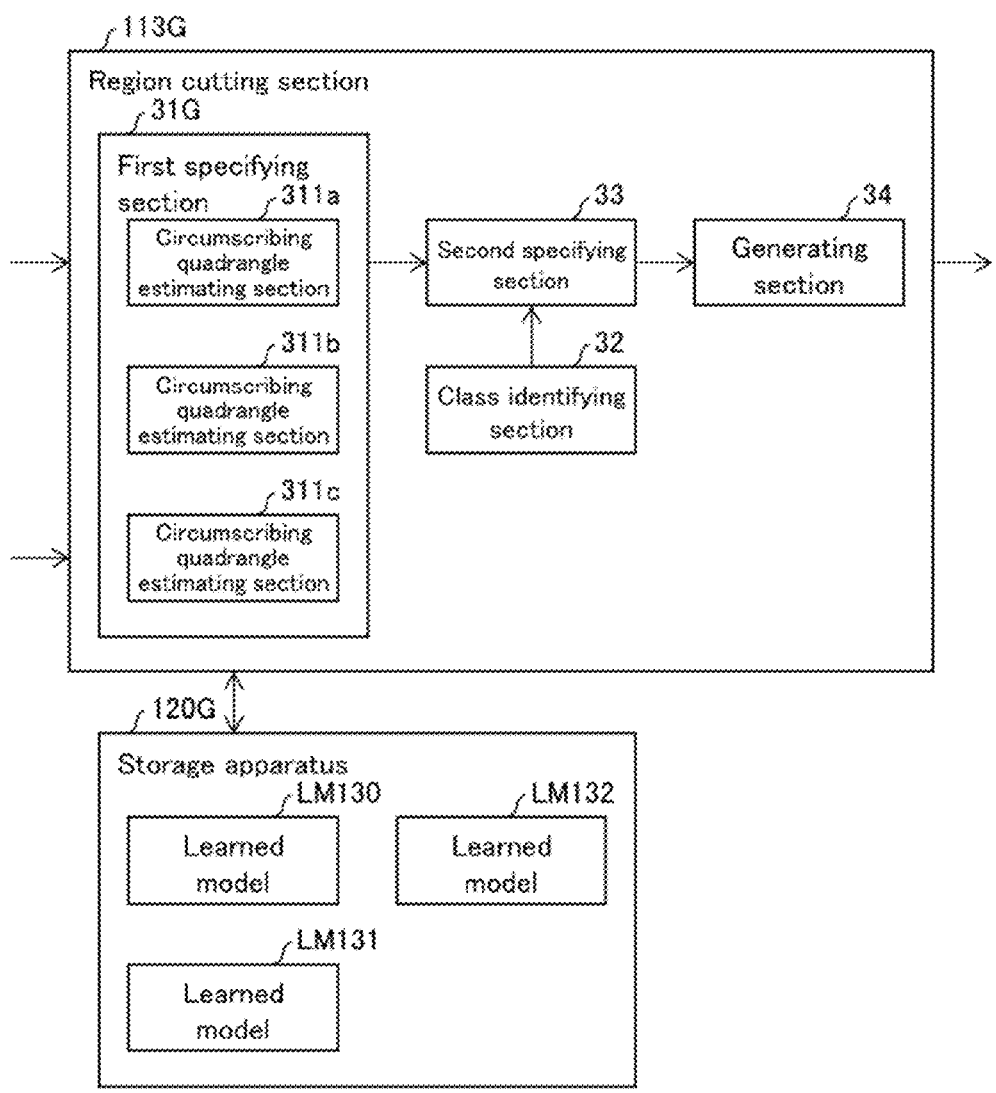
FIG. 21 is a block diagram illustrating a configuration of a region cutting section in accordance with a seventh example embodiment of the present invention.

An information processing apparatus 10G in accordance with the present example embodiment includes a region cutting section 113G and a storage apparatus 120G in place of the region cutting section 113 in accordance with the above-described third example embodiment. FIG. 21 is a block diagram illustrating an example of a configuration of the region cutting section 113G. The region cutting section 113G includes a first specifying section 31G in place of the first specifying section 31. The storage apparatus 120G includes learned models LM130 to LM132 in place of the learned model LM13. As described above, the present example embodiment differs from the above-described third example embodiment in that the present example embodiment uses, in place of the learned model LM13 which outputs plural pieces of region data, the plurality of learned models LM130 to LM132 each of which outputs region data.

In the present example embodiment, the first specifying section 31G specifies a plurality of regions of an object with use of the learned models LM130 to LM132 which (a) receive, as an input, image data indicating an image and region candidate data indicating a candidate for a region in which the object in the image exists and (b) output plural pieces of region data indicating regions in which the object in the image exists.

The first specifying section 31 includes circumscribing quadrangle estimating sections 311a to 311c. The circumscribing quadrangle estimating sections 311a to 311c specify the regions of the object included in the image on the basis of respective different references. In the present example embodiment, the circumscribing quadrangle estimating sections 311a to 311c specify the regions of the object included in the image on the basis of respective different reference axes. To be more specific, the circumscribing quadrangle estimating sections 311a to 311c specify the regions of the object on the basis of the estimation results obtained with use of the learned models LM130 to LM132. In a case where there is no need to distinguish the circumscribing quadrangle estimating sections 311a to 311c from each other, the expression "circumscribing quadrangle estimating section 311" is simply used.

(Learned Model)

The learned models LM130 to LM132 are learned models constructed by machine learning. Each of the learned models LM130 to LM132 (a) receives, as an input, the image data indicating the image and the region candidate data indicating the candidate for the region in which the object in the image exists and (b) outputs region data indicating a region in which the object in the image exists. The learned models LM130 to LM132 have been trained so that the learned models LM130 to LM132 respectively output pieces of region data indicating regions having respective different reference positions or respective different reference directions.

Each of the pieces of input data for the learned models LM130 to LM132 includes the image data and the region candidate data. Each of the pieces of output data from the learned models LM130 to LM132 is region data indicating a region of the object, and includes, for example, parameters representing the position and the size of a circumscribing quadrangle of the object.

The circumscribing quadrangle estimating sections 311a to 311c specify a plurality of regions of the object on the basis of a plurality of reference axes. In an example, with use of the learned models LM130 to LM132, the circumscribing quadrangle estimating sections 311a to 311c detect circumscribing quadrangles of the object on the basis of the respective different reference axes.

The learned models LM130 to LM132 have respective different reference axes for a region to be cut out. The pieces of region data to be output from the learned models LM130 to LM132 are, for example, the regions r130 to r132 shown in FIG. 9. In this case, the reference axes a130 to a132 shown in FIG. 9 are reference axes defined respectively for the learned models LM130 to LM132.

In an example, the output data from the learned model LM130 indicates the circumscribing quadrangular region r130 of the object OBJ1, the region r130 having two sides parallel with the reference axis a130. The output data from the learned model LM131 indicates the circumscribing quadrangular region r131 of the object OBJ1, the region r131 having two sides parallel with the reference axis a131. The output data from the learned model LM132 indicates the circumscribing quadrangular region r132, the region r132 having two sides parallel with the reference axis a132.

Eighth Example Embodiment

The following description will discuss an eighth example embodiment of the present invention in detail with reference to the drawings. Note that members having identical functions to those of the first to seventh example embodiments are given identical reference signs, and a description thereof will be omitted.

Figure 22:
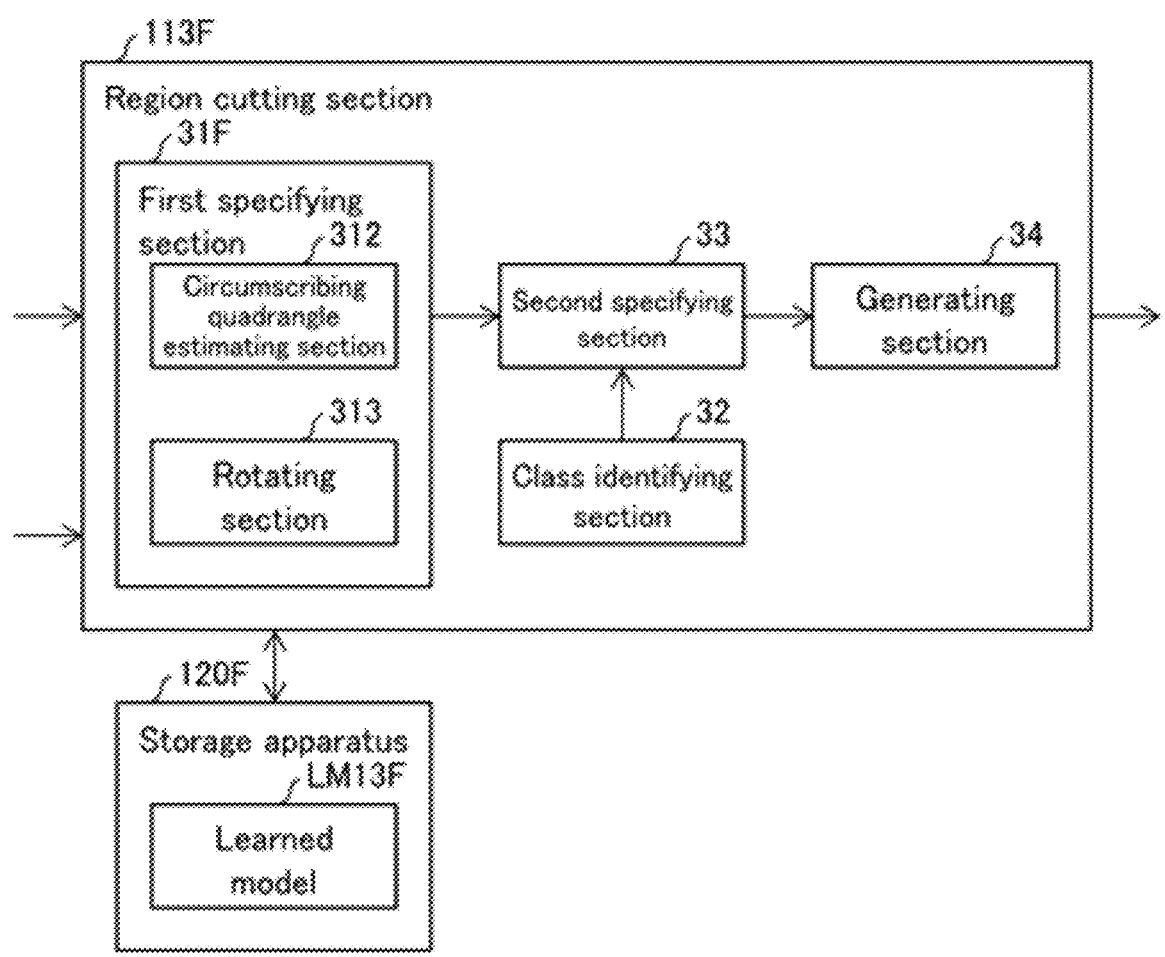
FIG. 22 is a block diagram illustrating an example of a hardware configuration of an information processing apparatus in accordance with each example embodiment of the present invention.

An information processing apparatus 10F in accordance with the present example embodiment includes a region cutting section 113F in place of the region cutting section 113 of the above-described third example embodiment. FIG. 22 is a block diagram illustrating an example of a configuration of the region cutting section 113F. The region cutting section 113F includes a first specifying section 31F in place of the first specifying section 31.

The first specifying section 31F includes a circumscribing quadrangle estimating section 312 and a rotating section 313. The circumscribing quadrangle estimating section 312 specifies regions of an object included in an image on the basis of a plurality of references. In the present example embodiment, the circumscribing quadrangle estimating section 312 specifies the regions of the object included in the image on the basis of the plurality of reference axes. To be more specific, the circumscribing quadrangle estimating section 312 specifies the regions of the object on the basis of a result of estimation carried out with use of a learned model LM13F.

The learned model LM13F is a learned model constructed by machine learning so as to output data indicating the regions of the object included in the image. Input data for the learned model LM13F includes the image data and the candidate region data. Output data from the learned models LM13F is region data indicating a region of the object, and includes, for example, parameters representing the position and the size of a circumscribing quadrangle of the object.

The rotating section 313 generates rotated image data which is a resultant of rotating the image on the basis of a plurality of reference axes $a\theta_i$ (i is an integer satisfying $1 \leq i \leq N$), and supplies, to the circumscribing quadrangle estimating section 312, the rotated image data thus generated. In an example, the rotating section 313 generates two rotated images, i.e., a rotated image Img1 that is a resultant of rotating an image Img0, which is a subject to be identified, by an angle $\theta 1$ and a rotated image Img2 that is a resultant of rotating the image Img0 by an angle $\theta 2$.

In this case, the circumscribing quadrangle estimating section 312 obtains first region data which is obtained by inputting, into the learned model LM13F, the image data indicating the image Img0 and the region candidate data. Further, the circumscribing quadrangle estimating section 312 obtains second region data which is obtained by inputting, into the learned model LM13F, the image data indicating the image Img1 and the region candidate data. Furthermore, the circumscribing quadrangle estimating section 312 obtains third region data which is obtained by inputting, into the learned model LM13F, the image data indicating the image Img3 and the region candidate data. The circumscribing quadrangle estimating section 312 supplies, to the second specifying section 33, the first region data, the second region data, and the third region data thus obtained.

The second specifying section 33 specifies an identification region for an object with use of either or both of a union and an intersection of two or more of a plurality of regions specified by the first specifying section 31F. The second specifying section 33 specifies the identification region by the method identical to that of the above-described third example embodiment, and therefore a detailed description thereof will be omitted.

Ninth Example Embodiment

In each of the foregoing example embodiments, the region cutting section 113 uses, as input data for the learned model LM13, RoI, which is an output from RPN used in object detection methods such as Faster-RCNN. The region candidate data used as the input data for the learned model LM13 is not limited to those indicated in the foregoing example embodiments. The region candidate data may be, for example, data relating to another object detection method such as Single Shot MultiBox Detector (SSD) or You Only Look Once (YOLO). In an example, the input data for the learned model LM13 may be data according to YOLO, the data indicating regions corresponding to grid cells into which an entire image is divided.

[Software Implementation Example]

Part of or the whole of functions of the information processing apparatuses 10, 10A, 10B, 10C, 10D, and 10E can be realized by hardware such as an integrated circuit (IC chip) or can be alternatively realized by software.

In the latter case, each of the information processing apparatuses 10, 10A, 10B, 10C, 10D, and 10E is realized by, for example, a computer that executes instructions of a program that is software realizing the foregoing functions. FIG. 22 shows an example of such a computer (hereinafter, referred to as a "computer C"). The computer C includes at least one processor C1 and at least one memory C2. The memory C2 has a program P stored therein, the program P causing the computer C to operate as the information processing apparatuses 10, 10A, 10B, 10C, 10D, and 10E. In the computer C, the processor C1 reads and executes the program P from the memory C2, thereby realizing the functions of the information processing apparatuses 10, 10A, 10B, 10C, 10D, and 10E.

The processor C1 may be, for example, Central Processing Unit (CPU), Graphic Processing Unit (GPU), Digital Signal Processor (DSP), Micro Processing Unit (MPU), Floating point number Processing Unit (FPU), Physics Processing Unit (PPU), a microcontroller, or a combination of any of them. The memory C2 may be, for example, a flash memory, Hard Disk Drive (HDD), Solid State Drive (SSD), or a combination of any of them.

The computer C may further include Random Access Memory (RAM) in which the program P is loaded when executed and various data is temporarily stored. In addition, the computer C may further include a communication interface via which the computer C transmits/receives data to/from another apparatus. The computer C may further include an input-output interface via which the computer C is connected to an input-output apparatus such as a keyboard, a mouse, a display, and/or a printer.

The program P can be stored in a non-transitory, tangible storage medium M capable of being read by the computer C. Examples of the storage medium M encompass a tape, a disk, a card, a memory, a semiconductor memory, and a programmable logic circuit. The computer C can obtain the program P via the storage medium M. Alternatively, the program P can be transmitted via a transmission medium. Examples of such a transmission medium encompass a communication network and a broadcast wave. The computer C can also obtain the program P via the transmission medium.

[Supplementary Note 1]

The present invention is not limited to the example embodiments, but can be altered by a skilled person in the art within the scope of the claims. The present invention also encompasses, in its technical scope, any embodiment derived by combining technical means disclosed in differing embodiments.

[Supplementary Note 2]

Some or all of the above embodiments can be described as below. Note, however, that the present invention is not limited to aspects described below.

(Supplementary Remarks 1)

An information processing apparatus including: a first specifying means that specifies, as a region in which an object in an image exists, a plurality of regions having respective different reference positions or respective different reference directions; a second specifying means that specifies an identification region for the object on a basis of the plurality of regions specified by the first specifying means; and an identifying means that identifies the object on a basis of the identification region specified by the second specifying means.

With the above configuration, the information processing apparatus specifies the identification region on the basis of the plurality of regions of the object specified according to different references, and identifies the object on the basis of the identification region thus specified. Consequently, the identifying process with a suppressed effect of a background is realized. This makes it possible to enhance the accuracy of identifying the object.

(Supplementary Remarks 2)

The information processing apparatus described in Supplementary Remarks 1, wherein: the first specifying means specifies the plurality of regions with use of one or more learned models that (a) receive, as an input, image data indicating the image and region candidate data indicating a candidate for a region in which the object in the image exists and (b) output plural pieces of region data indicating regions in which the object in the image exists.

With the above configuration, the plurality of regions of the object are specified with use of output data from the learned model constructed by machine learning, and the identification region for the object is specified on the basis of the plurality of regions thus specified. This makes it possible to enhance the accuracy of specifying the identification region for the object included in the image.

(Supplementary Remarks 3)

The information processing apparatus described in Supplementary Remarks 2, wherein: each of the plural pieces of region data indicates a difference between (a) the region indicated by the piece of region data and (b) the candidate for the region indicated by the region candidate data.

With the above configuration, it is possible to specify the regions indicated by the plural pieces of region data on the basis of the differences between (a) the regions indicated by the pieces of region data output from the learned models and (b) the candidate for the region indicated by the region candidate data.

(Supplementary Remarks 4)

The information processing apparatus described in Supplementary Remarks 3, wherein: the first specifying means inputs, into the one or more learned models, the region candidate data obtained with use of a learned model that (a) receives, as an input, the image data indicating the image and (b) outputs the region candidate data.

With the above configuration, the information processing apparatus can obtain the region candidate data with use of the learned model.

(Supplementary Remarks 5)

The information processing apparatus described in any one of Supplementary Remarks 1 to 4, wherein: the second specifying means generates an identification image in which (a) a partial image in the identification region in the image is included and (b) a part other than the partial image is filled with a background color; and the identifying means identifies the object with use of an identification learned model that (a) receives, as an input, the identification image and (b) outputs a result of identification of the object.

With the above configuration, the information processing apparatus generates, as the identification image to be input to the identification learned model, the identification image in which a region other than the identification region is filled with the background color. This makes it possible to enhance the accuracy of identifying the object with use of the learned model.

(Supplementary Remarks 6)

The information processing apparatus described in Supplementary Remarks 5, wherein: the background color is identical to a background color of training data learned by the identification learned model.

With the above configuration, the background color of the identification image is identical to the background color of the training data learned by the identification learned model. This makes it possible to enhance the accuracy of identifying the object.

(Supplementary Remarks 7)

The information processing apparatus described in any one of Supplementary Remarks 1 to 6, wherein: the first specifying means specifies the plurality of regions having respective reference axes tilted at different angles.

With the above configuration, it is possible to reduce the background included in the identification region. By identifying the object on the basis of the identification region, it is possible to enhance the accuracy of identifying the object.

(Supplementary Remarks 8)

The information processing apparatus described in Supplementary Remarks 7, wherein: the second specifying means specifies the identification region on a basis of an intersection of the plurality of regions.

With the above configuration, it is possible to reduce the background included in the identification region. By identifying the object on the basis of the identification region, it is possible to enhance the accuracy of identifying the object.

(Supplementary Remarks 9)

The information processing apparatus described in any one of Supplementary Remarks 1 to 6, wherein: the first specifying means specifies the plurality of regions having respective different reference positions.

With the above configuration, it is possible to reduce the background included in the identification region. By identifying the object on the basis of the identification region, it is possible to enhance the accuracy of identifying the object.

(Supplementary Remarks 10)

The information processing apparatus described in Supplementary Remarks 9, wherein: the second specifying means specifies the identification region on a basis of a union of the plurality of regions.

With the above configuration, it is possible to reduce the background included in the identification region. By identifying the object on the basis of such an identification region, it is possible to enhance the accuracy of identifying the object.

(Supplementary Remarks 11)

An information processing apparatus including: a first generating means that generates region candidate data indicating a candidate for a region in which an object in an image exists; a second generating means that generates plural pieces of region data respectively indicating a plurality of regions in which the object in the image exists and which have respective different reference positions or respective different reference directions; and a third generating means that generates one or more learned models that (a) receive, as an input, image data indicating the image and the region candidate data and (b) output the plural pieces of region data.

With the above configuration, the information processing apparatus generates the plural pieces of region data which specify the regions of the object in the image on the basis of respective different reference positions or respective different reference directions relating to region specification and which are used to identify the object. Further, the information processing apparatus generates the learned models having machine-learned by using the generated region data as training data. By using these learned models to identify the object, the identifying process with a suppressed effect of a background is realized.

(Supplementary Remarks 12)

The information processing apparatus described in Supplementary Remarks 11, wherein: the second generating means generates plural pieces of region data respectively indicating a plurality of regions which have respective reference axes tilted at different angles.

With the above configuration, the information processing apparatus generates the plural pieces of region data indicating the plurality of regions which have respective reference axes tilted at different angles, and causes the learned model to machine-learn by using the generated region data as training data. By using these learned models to identify the object, the identifying process with a suppressed effect of a background is realized.

(Supplementary Remarks 13)

The information processing apparatus described in Supplementary Remarks 12, wherein: the second generating means includes: a rotated image generating means that generates a rotated image which is a resultant of rotating the image in a given direction; a region specifying means that specifies a region of the object included in the rotated image; and a rotated region generating means that generates, as one of the plural pieces of region data, data indicating a rotated region which is a resultant of rotating the region in a direction reverse to the given direction.

With the above configuration, the information processing apparatus can generate training data for the learned model used to identify the object.

(Supplementary Remarks 14)

The information processing apparatus described in Supplementary Remarks 11, wherein: the second generating means generates plural pieces of region data respectively indicating the plurality of regions having respective different reference positions.

With the above configuration, the information processing apparatus generates the plural pieces of region data indicating the plurality of regions having respective different reference positions, and causes the learned model to machine-learn by using the generated region data as training data. By using these learned models to identify the object, the identifying process with a suppressed effect of a background is realized.

(Supplementary Remarks 15)

An information processing method including: an information processing apparatus specifying, as a region in which an object in an image exists, a plurality of regions having respective different reference positions or respective different reference directions; the information processing apparatus specifying an identification region for the object on a basis of the plurality of regions thus specified; and the information processing apparatus identifying the object on a basis of the identification region thus specified.

With the above configuration, it is possible to provide the same effect as that described in Supplementary Remarks 1.

(Supplementary Remarks 16)

A program causing a computer to function as an information processing apparatus, the program causing the computer to function as: a first specifying means that specifies, as a region in which an object in an image exists, a plurality of regions having respective different reference positions or respective different reference directions; a second specifying means that specifies an identification region for the object on a basis of the plurality of regions specified by the first specifying means; and an identifying means that identifies the object on a basis of the identification region specified by the second specifying means.

With the above configuration, it is possible to provide the same effect as that described in Supplementary Remarks 1.

(Supplementary Remarks 17)

A storage medium in which a program is stored, the program causing a computer to function as an information processing apparatus, the program causing the computer to function as: a first specifying means that specifies, as a region in which an object in an image exists, a plurality of regions having respective different reference positions or respective different reference directions; a second specifying means that specifies an identification region for the object on a basis of the plurality of regions specified by the first specifying means; and an identifying means that identifies the object on a basis of the identification region specified by the second specifying means.

With the above configuration, it is possible to provide the same effect as that described in Supplementary Remarks 1.

[Supplementary Note 3]

Further, some or all of the above embodiments can be expressed as below.

An information processing apparatus including at least one processor, the at least one processor being configured to execute: a first specifying process of specifying, as a region in which an object in an image exists, a plurality of regions having respective different reference positions or respective different reference directions; a second specifying process of specifying an identification region for the object on a basis of the plurality of regions specified in the first specifying process; and an identifying process of identifying the object on a basis of the identification region specified in the second specifying process. The above information processing apparatus may further include a memory. The memory may have a program stored therein, the program causing the processor to execute the first specifying process, the second specifying process, and the generating process. The program may be stored in a non-transitory, tangible storage medium capable of being read by a computer.

REFERENCE SIGNS LIST 10, 10A, 10B, 10C, 10D, 10E: Information processing apparatus
11, 31: First specifying section
12, 33, 33C: Second specifying section
13: Identifying section
34: Generating section
14, 121: First generating section
15, 122, 122E: Second generating section
16, 123: Third generating section
32: Class identifying section
110B, 110D, 110E: Control section
111, 221: Image obtaining section
112: General-purpose object detecting section
113, 113C, 113E: Region cutting section
114: Identifying section
115: Output section
120B: Storage apparatus
150, 150E: Estimation phase executing section
160, 160E: Learning phase executing section
222: Image rotating section
223: Object detecting section
224: Circumscribing quadrangle calculating section
311a, 311b, 311c, 312: Circumscribing quadrangle estimating section

What is claimed is:

1. An information processing apparatus comprising at least one processor configured to execute:
   a first specifying process of specifying, as a region in which an object in an image exists, a plurality of regions having respective different reference positions or respective different reference directions, the plurality of regions including an identical object;
   a second specifying process of specifying an identification region for the object on a basis of the plurality of regions specified in the first specifying process; and
   an identifying process of identifying the object on a basis of the identification region specified in the second specifying process, wherein:
   in the first specifying process, the at least one processor specifies the plurality of regions with use of one or more learned models that (a) receive, as an input, image data indicating the image and region candidate data indicating a candidate for a region in which the object in the image exists and (b) output plural pieces of region data indicating regions in which the object in the image exists.

2. The information processing apparatus according to claim 1, wherein:
   each of the plural pieces of region data indicates a difference between (a) the region indicated by the piece of region data and (b) the candidate for the region indicated by the region candidate data.

3. The information processing apparatus according to claim 2, wherein:
   in the first specifying process, the at least one processor inputs, into the one or more learned models, the region candidate data obtained with use of a learned model that (a) receives, as an input, the image data indicating the image and (b) outputs the region candidate data.

4. The information processing apparatus according to claim 1, wherein:
   in the second specifying process, the at least one processor generates an identification image in which (a) a partial image in the identification region in the image is included and (b) a part other than the partial image is filled with a background color; and
   in the identifying process, the at least one processor identifies the object with use of an identification learned model that (a) receives, as an input, the identification image and (b) outputs a result of identification of the object.

5. The information processing apparatus according to claim 4, wherein:
   the background color is identical to a background color of training data learned by the identification learned model.

6. The information processing apparatus according to claim 1, wherein:
   in the first specifying process, the at least one processor specifies the plurality of regions having respective reference axes tilted at different angles.

7. The information processing apparatus according to claim 6, wherein:
in the second specifying process, the at least one processor specifies the identification region on a basis of an intersection of the plurality of regions.

8. The information processing apparatus according to claim 1, wherein:
in the first specifying process, the at least one processor specifies the plurality of regions having respective different reference positions.

9. The information processing apparatus according to claim 8, wherein:
in the second specifying process, the at least one processor specifies the identification region on a basis of a union of the plurality of regions.

10. An information processing apparatus comprising at least one processor configured to execute:
a first generating process of generating region candidate data indicating a candidate for a region in which an object in an image exists;
a second generating process of generating plural pieces of region data respectively indicating a plurality of regions in which the object in the image exists and which have respective different reference positions or respective different reference directions, the plurality of regions including an identical object; and
a third generating process of generating one or more learned models that (a) receive, as an input, image data indicating the image and the region candidate data and (b) output the plural pieces of region data, wherein:
in the second generating process, the at least one processor generates plural pieces of region data respectively indicating the plurality of regions having respective reference axes tilted at different angles, and
in the second generating process, the at least one processor executes:
a rotated image generating process of generating a rotated image which is a resultant of rotating the image in a given direction;
a region specifying process of specifying a region of the object included in the rotated image; and
a rotated region generating process of generating, as one of the plural pieces of region data, data indicating a rotated region which is a resultant of rotating the region in a direction reverse to the given direction.

11. An information processing method comprising:
an information processing apparatus specifying, as a region in which an object in an image exists, a plurality of regions having respective different reference positions or respective different reference directions, the plurality of regions including an identical object;
the information processing apparatus specifying an identification region for the object on a basis of the plurality of regions thus specified; and
the information processing apparatus identifying the object on a basis of the identification region thus specified, wherein:
the information processing apparatus specifies the plurality of regions with use of one or more learned models that (a) receive, as an input, image data indicating the image and region candidate data indicating a candidate for a region in which the object in the image exists and (b) output plural pieces of region data indicating regions in which the object in the image exists.

12. A non-transitory, computer-readable storage medium in which a program is stored, the program causing a computer to function as an information processing apparatus recited in claim 1,
the program causing the computer to execute each of the processes.

* * * * *